United States Patent
Benveniste

(10) Patent No.: US 6,259,922 B1
(45) Date of Patent: Jul. 10, 2001

(54) MANAGING INTERFERENCE IN CHANNELIZED CELLULAR SYSTEMS

(75) Inventor: Mathilde Benveniste, South Orange, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/037,976

(22) Filed: Mar. 9, 1998

Related U.S. Application Data

(63) Continuation-in-part of application No. 08/581,694, filed on Dec. 29, 1995, now Pat. No. 5,787,352.

(51) Int. Cl.⁷ ...................................................... H04Q 7/00
(52) U.S. Cl. ............................ 455/452; 455/63; 455/446
(58) Field of Search .............................. 455/13.1, 33.1, 455/34.1, 63, 296, 38.3, 62, 69, 295, 59, 446–452, 443

(56) References Cited

U.S. PATENT DOCUMENTS

| | | | |
|---|---|---|---|
| 5,038,399 | * 8/1991 | Bruckert | 455/447 |
| 5,404,574 | * 4/1995 | Benveniste | 455/447 |
| 5,483,667 | * 1/1996 | Faruque | 455/447 |
| 5,491,837 | * 2/1996 | Haartsen | 455/437 |
| 5,507,034 | * 4/1996 | Bodin et al. | 455/452 |
| 5,513,379 | * 4/1996 | Benveniste et al. | 455/451 |
| 5,539,728 | * 7/1996 | Gaiani et al. | 455/67.1 |
| 5,579,373 | * 11/1996 | Jang | 455/436 |
| 5,603,110 | * 2/1997 | Heinzmann | 455/296 |
| 5,613,200 | * 3/1997 | Hamabe | 455/450 |
| 5,787,352 | * 7/1998 | Benveniste | 455/452 |

OTHER PUBLICATIONS

Finean, "Channel Assignment in Mobile Satellite Networks", IEE Colloq. (1994) No. 82.*
Raghvendra et al, "Channel Efficiency in Digital Cellular Communications Systems", Vehicular Technology, pp. 1005–1007, Feb. 1992.*
Mundra et al, "Radio Frequency Interference–An Aspect for Designing a Mobile Radio Communications System", Vehicular Technology, pp. 860–865, Feb. 1992.*
Kataoka et al, "Channel Information Assisted Reuse Partitioning", Universal Personal Comm., Int'l Conference, pp. 536–540, Apr. 1994.*

* cited by examiner

*Primary Examiner*—Vu Le

(57) ABSTRACT

Network management methods are disclosed for reducing channel interference in channelized wireless communications systems, to reduce either co-channel or neighbor-channel interference, or a combination thereof. These techniques reduce total interference. The techniques are in the context of circuit-switched calls of independent inter-arrival times and different durations and can be used for both voice and data packet-based transmission. The forward and reverse links of a wireless connection are de-coupled, as for example for packet assignment, and the techniques are applied in each of the two directions independently.

23 Claims, 12 Drawing Sheets

| CELLS | A | B | C | D |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI CONFLICTS | 4 | 3 | 3 | 3 |

| CELLS | A(+) | B(−) | C(+) | D(−) |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI CONFLICTS | 2 | 2 | 1 | 1 |

FIG. 8A

| CELLS | A | B | C | D |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI CONFLICTS | 4 | 3 | 3 | 3 |

FIG. 8B

| CELLS | A(+) | B(−) | C(+) | D(−) |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI CONFLICTS | 2 | 2 | 1 | 1 |

N=8

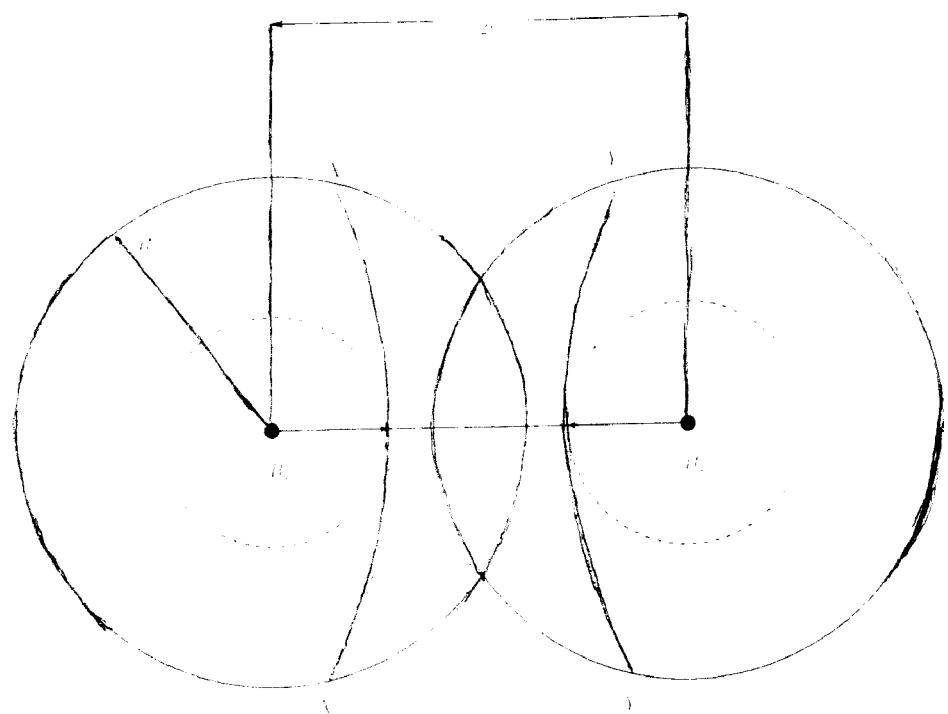
Figure X Use of interfering channels in neighboring cells

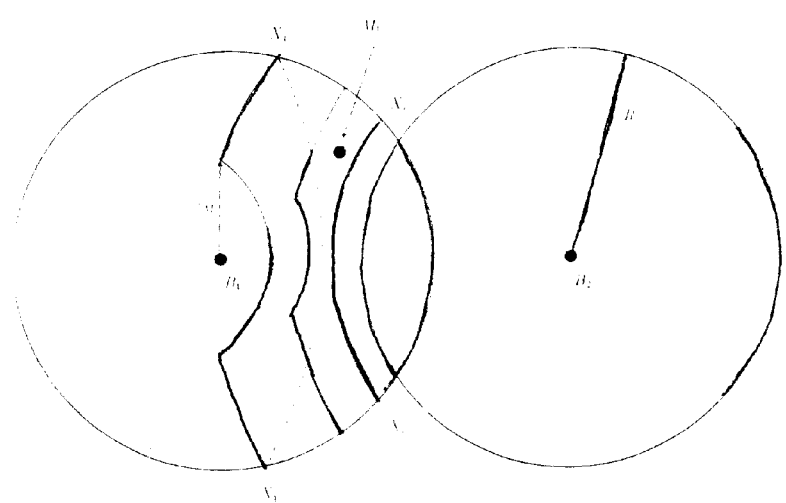
Figure 2. Use of interfering channels in neighboring cells with power control

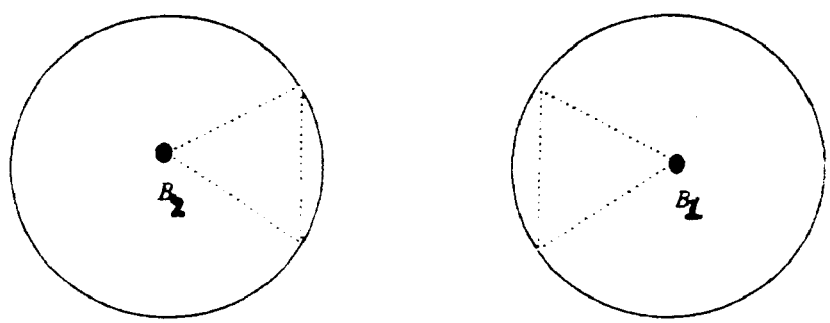
Figure 4 Decreasing neighbor distance with increased user-to-base distance
16
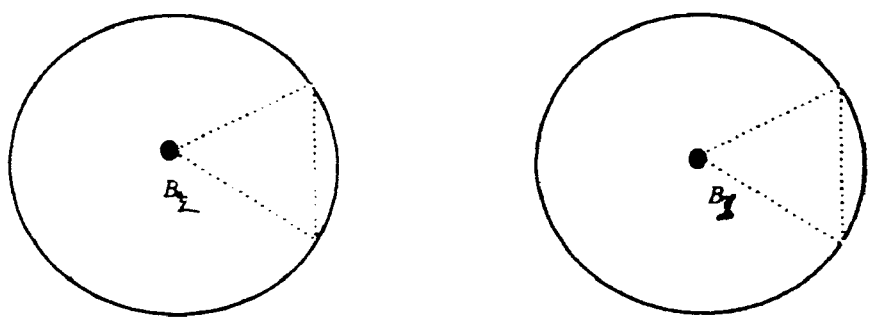
Figure 5 Increasing neighbor distance with increased user-to-base distance
17

MANAGING INTERFERENCE IN CHANNELIZED CELLULAR SYSTEMS

CROSS-REFERENCES TO RELATED APPLICATIONS

This application is a continuation-in-part of the copending U.S. patent application by Mathilde Benveniste entitled "SYSTEM AND METHOD FOR MANAGEMENT OF NEIGHBOR-CHANNEL INTERFERENCE WITH POWER CONTROL AND DIRECT ASSIGNMENT", Ser. No. 08/581,694, filed Dec. 29, 1995, assigned to AT&T now U.S. Pat. No. 5,787,352.

This application is related to U.S. patent application Ser. No. 08/580,570, filed Dec. 29, 1995, entitled "System and Method For Managing Neighbor Channel Interference In Channelized Cellular Systems" (M. BENVENISTE-7), now U.S. Pat. No. 5,740,536 and U.S. patent application Ser. No. 08/580,568, filed Dec. 29, 1995, entitled "System and Method For Management of Neighbor Channel Interference With Cellular Reuse Partitioning", (M. BENVENISTE-8), said related applications being assigned to AT&T and incorporated herein by reference.

FIELD OF THE INVENTION

This application is related to wireless communications systems and more particularly to improved means for managing channel interference in channelized cellular systems.

BACKGROUND OF THE INVENTION

In the art of wireless communications, considerations of spectral efficiency and maximization of available channels generally dictate the use of a cellular arrangement of such channels and the frequencies from which they are derived—i.e., a service area is partitioned into connected service domains known as cells. Within a particular cell, users communicate via radio links with a base station serving that cell, that base station being connected to base stations for other cells comprising a wireless communications network. That wireless communications network will, in turn, ordinarily be connected with one or more wired networks. To communicate using such a wireless network, each user is assigned one of a discrete set of channels.

A conventional regular hexagonal cell layout of a wireless cellular communications system is shown in schematic form in FIG. 1. As is known, depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them. Each channel set comprises a plurality of individual transmit and receive radio channels for use within the cell area In the model shown in FIG. 1, cells marked "A" are co-user cells and all use the same channel set. The same is true for co-user cells marked "B", "C" etc., each of which has its own assigned channel set.

Each cell is radiated by an antenna system associated with a base station, which base stations may be interconnected with each other and/or with other networks. An omni-directional radiation pattern is depicted by antenna 101 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design.

Frequency reuse assignments are generally implemented through the adoption of simple rules for identifying co-user cells and for partitioning the RF spectrum into channel sets. Channel assignment approaches can be broadly classified into two categories: fixed and flexible [See, M. Benveniste, "Self Configurable Wireless Systems", forthcoming]. Fixed channel assignment fixes the relationship between cells and the channels serving them. Only the channels allocated to a cell can serve calls in that cell, and each channel can be used simultaneously by all the cells to which the channel is assigned. An example of fixed channel assignment is "regular" channel assignment, which is characterized by equally-sized, regularly-spaced cells. Regular channel assignment is optimal for a system with traffic distributed uniformly across cells.

When the traffic distribution is not uniform, an optimal fixed "non-regular" channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods exploit the capability of a system for remote, software-driven, returning of the base station radios, which capability enables channel capacity to adapt to traffic variation. The class of flexible channel assignment methodologies includes adaptive and dynamic channel assignment methods, and a hybrid of the two, adaptive-dynamic channel assignment [See, M. Benveniste, "Self Configurable Wireless Systems", id].

It is also well known that the quality of communication in wireless systems depends substantially on the ratio of the received signal to interference (S/I). The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. When the interfering neighbor channel is adjacent to the operating channel in the spectrum, the term adjacent-channel interference is generally used. To achieve the desired voice or data transmission quality, the ratio of the received signal over the combined co-channel and neighbor-channel interference must be above a specified threshold.

The need to avoid using neighbor channels within a cell and in neighbor cells has been well-recognized. In conventional channel assignment in analog AMPS systems, where three-sector cells re-use the spectrum in clusters of 7 cells, the spacing of 21 channels (630 kHz) between channels serving the same cell—as illustrated generally by the sectorized pattern of FIG. 2—has been more than adequate to render negligible any interference from neighbor channels. For physically contiguous cells, it is sufficient to avoid the assignment of adjacent channel sets to sectors of the same cell, or to sectors in such contiguous cells which would be contiguous to the sector under consideration. As can be seen in FIG. 2, such a channel assignment exists for the three-sector re-use group of size 7.

As less conventional channel assignment approaches, like flexible or non-regular fixed channel assignment, are pursued, however, such near automatic satisfaction of channel spacing requirements no longer occurs. There the cellular system designer faces the question: what is the minimum spectrum separation required between channels used simultaneously in a cell, or in neighboring cells. The approaches which have been proposed for answering this question do not consider neighbor-channel interference adequately, if at all. In particular, prior treatment of neighbor-channel interference, and the derivation of channel spacing requirements, has not considered the overall impact on the S/I ratio [See: W. C. Y. Lee, Mobile Cellular Telecommunications Systems, McGraw-Hill, New York, 1989]. Such failure to consider the impact of neighbor-channel interference on the S/I ratio will result in a signal that is weaker than the interference. By balancing the relative strength of an interfering signal located near the receiver with the signal strength drop caused by channel separation, the resulting S/I ratio would be equal to 1 (0 dB) in the absence of co-channel interference. If some co-channel interference were present, the resulting S/I ratio would be less than 1 (negative, when expressed in dB).

Since the S/I requirement implies a restriction on total interference, and total interference is the sum of two terms (co-channel plus neighbor-channel interference), there is a trade-off between them. Neighbor-channel interference decreases when there is a larger frequency-spectrum separation between channels, thus leaving a greater margin for co-channel interference. A lesser re-use distance is thus allowed, and the system capacity is higher, at least in principle. A larger channel separation, however, makes fewer channels available in each cell, which would lead to a capacity decrease if everything else stayed the same. Thus an important objective of the system designer would be a determination of the optimal channel separation for which the S/I requirement is met, and spectrum utilization is maximum.

The quality of communication in wireless systems depends on the ratio of the received signal to interference (S/I). Interference consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. When the interfering neighbor channel is adjacent to the operating channel in the spectrum, the term adjacent- channel interference is used. To achieve the desired voice or data transmission quality, the ratio of the received signal over the combined co-channel and channel interference must be above a specified threshold.

SUMMARY OF THE INVENTION

Methods are disclosed for reducing the channel interference in channelized wireless communications systems. Similar techniques are also employed to reduce either co-channel or neighbor-channel interference, or a combination thereof This disclosure illustrates the broader application of these techniques in reducing total interference.

The techniques are presented in the context of circuit-switched calls of independent inter-arrival times and different durations. The same techniques can be used for both voice and data packet-based transmission. Finally, if the forward and reverse links of a wireless connection are de-coupled, as for example for packet assignment, the techniques could be applied in each of the two directions independently.

A first embodiment of the invention employs directed assignment to manage interference in a wireless communications network. The network has areas partitioned into a plurality of cells, wherein a second plurality of communications channels are allocated among the cells, and wherein there exist pairs of cells causing each other interference. The method includes the steps of causing each cell in the plurality of cells to be assigned one of two labels, whereby no pair of interfering cells is assigned the same label, and assigning channels to users in each cell of the plurality of cells wherein the cells' users are assigned to channels starting on one end of an assigned spectrum for first cells with a first the label, while for second cells with a second the label, the second cells' users are assigned channels starting on an opposite end of the assigned spectrum.

A second embodiment of the invention employs mixed power control to manage interference in a wireless communications network. The network has areas partitioned into a plurality of cells, wherein a second plurality of communications channels are allocated among the cells, and wherein there exist pairs of cells causing each other interference. The method includes the steps of determining a radial distance from a base station in a first cell, applying power control for down-link transmissions from the base station to a first mobile unit located beyond the radial distance from the base station in the first cell, the first mobile unit subject to interference from the second cell, and omitting an application of power control for down-link transmissions from the base station to a second mobile unit located within the radial distance from the base station, the second mobile unit subject to interference from the second cell. The radial distance is determined so as to have an acceptable level of interference.

The second embodiment further includes applying power control for up-link transmissions from a mobile unit to the base station for mobile units located within the radial distance from the base station, and omitting an application of power control for up-link transmissions from a mobile unit to the base station for mobile units located beyond the radial distance from the base station.

A third embodiment of the invention employs mixed power control with user matching to manage interference in a wireless communications network. The network has areas partitioned into a plurality of cells, wherein a second plurality of communications channels are allocated among the cells, and wherein there exist pairs of cells causing each other interference that increases with increased distance of the users within these cells from their serving base station. The method includes the steps of determining a radial distance from a first base station in a first cell, assigning first channels in the first cell to users who are distant from the first base station and assigning second channels in the second cell that are subject to interference from the first channels, to users who are close to a second base station in the second cell, assigning third channels in the first cell to users who are close to the first base station and assigning fourth channels in the second cell that are subject to interference from the third channels, to users who are distant from the second central transmission, applying power control for down-link transmissions from the first base station to a first user located beyond the radial distance from the first base station in the first cell, the first user subject to interference from the second cell, and omitting an application of power control for down-link transmissions from the base station to a second user located within the radial distance from the first base station, the second user subject to interference from the second cell. The radial distance is determined so as to have an acceptable level of interference.

A fourth embodiment of the invention employs mixed power control with directed assignment to manage interference in a wireless communications network wherein a second plurality of communications channels are allocated among the cells and wherein there exist pairs of cells causing each other interference that increases with increased distance of the users within these cells from their serving base station. The method includes the steps of applying power control, causing each cell in the plurality of cells to be assigned one of two labels, whereby no pair of interfering cells is assigned the same label, and assigning channels to users in each cell of the plurality of cells wherein high power users are assigned to channels starting on one end of the assigned spectrum for cells with the first the label, while for cells with the second label, the same users are assigned channels starting on the opposite end of the assigned spectrum.

DESCRIPTION OF THE FIGURES

Some of the objects, features, and advantages of the invention are illustrated by the accompanying figures.

FIG. 8 depicts an example of the Directed Assignment methodology of the invention.

FIG. 14 illustrates Use of interfering channels in neighboring cells.

FIG. 15 illustrates Use of interfering channels in neighboring cells with power control.

FIG. 16 illustrates Decreasing neighbor distance with increased user-to-base distance.

FIG. 17 illustrates Increasing neighbor distance with increased user-to-base distance.

DESCRIPTION OF THE PREFERRED EMBODIMENTS

The discussion following will be presented partly in terms of algorithms and symbolic representations of operations on data within a computer system. As will be understood, these algorithmic descriptions and representations are a means ordinarily used by those skilled in the systems engineering arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

For clarity of explanation, an illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, some or all of the functions of the "OMC", "MSCs", and "BSs" presented in FIGS. 3 and 4, as well as the "Computer Processor" of FIG. 4, may be provided by one or more processors, including shared processors. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1:
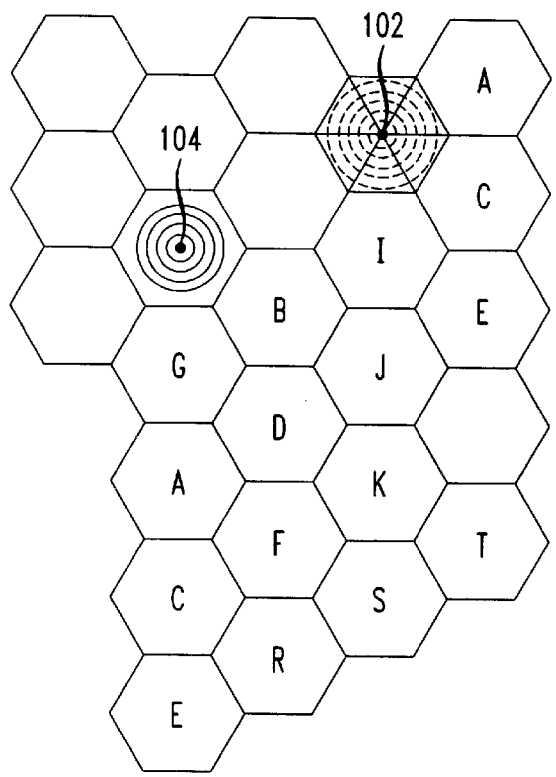
FIG. 1 depicts a schematic diagram of a regular cell layout for a wireless cellular communications system.
Figure 2:
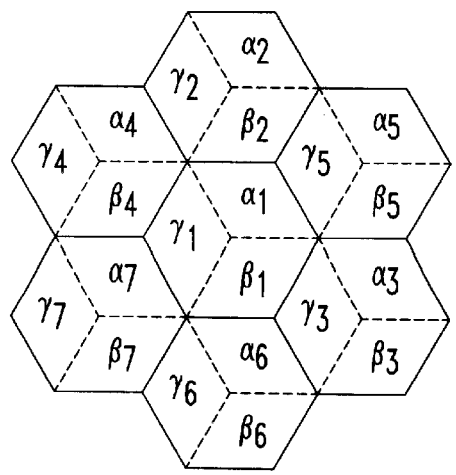
FIG. 2 depicts a sectorized cell arrangement based on a re-use factor of 7.
Figure 3:
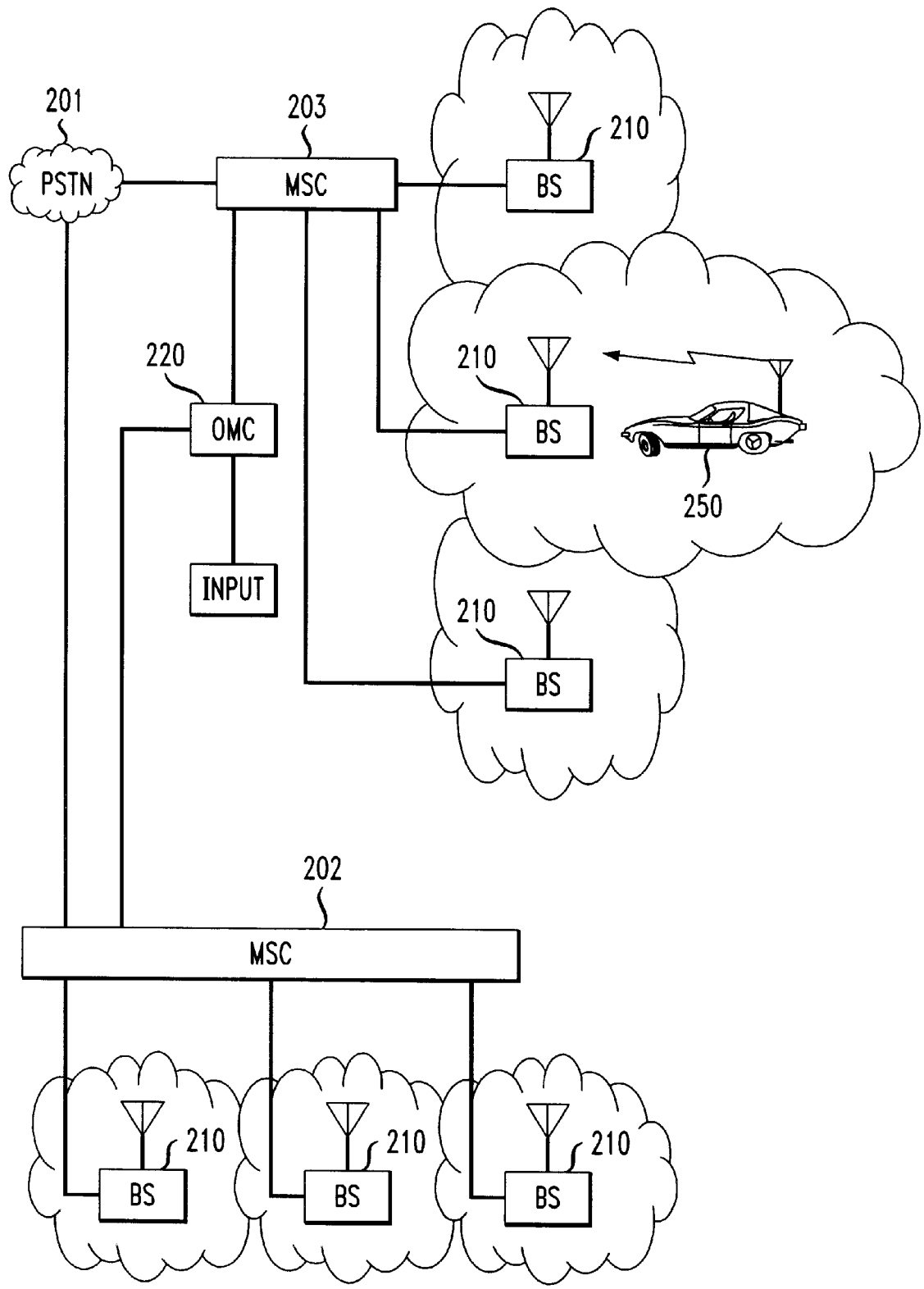
FIG. 3 shows in block diagram form the major elements of a wireless cellular communications system and the typical interconnections among such elements.

A typical cellular system is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radio telephoned 250 within its cell coverage area.

An operation and management center (OMC) 220 is coupled to the MSCs 202 and 203 to control their system operation and their associated BSs 210. OMC 220 is a central control station which includes data processing and input for accepting data input from data storage and real time control. In the case of flexible channel assignment, this data processing arrangement may be utilized in implementing channel arrangements in combination with remotely tunable radio transceivers located at the BSs.

Figure 4:
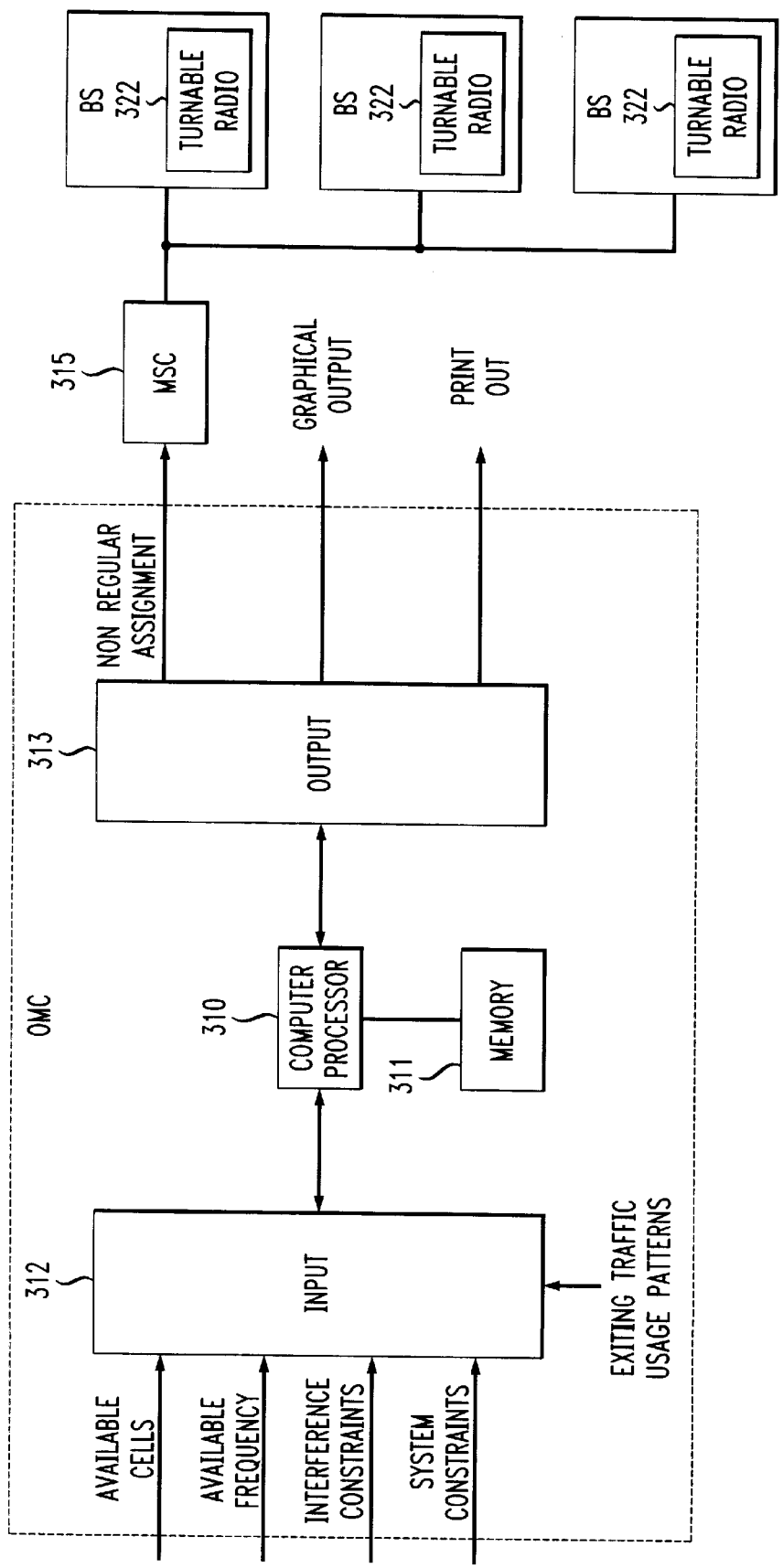
FIG. 4 shows a schematic block diagram of a data processing system for controlling the assignment of radio channels to various cells of a wireless cellular communications system using a flexible channel assignment methodology.

For such a flexible channel assignment case, an illustrative embodiment of data processing equipment included in the OMC for controlling the assignment and tuning of radio transceivers at the BSs is shown in schematic block diagram form in FIG. 4. A Computer Processor 310 has a stored program included in an associated Memory 311. This program may include instructions for performing the assignment of radio channels to a cellular system. Initial input data is supplied through the Input function 312 to the Computer Processor 310. Inputs include: the available cells, available radio frequencies, and interference information, usually in the form of a cell-to-cell interference matrix which defines the interference to each cell from every other cell. Further inputs include system constraints necessary for the desired channel assignment and traffic usage patterns. To implement a flexible channel assignment methodology, the channel assignment process will be performed by Computer Processor 310 according to the instructions contained in Memory 311. The resulting channel assignments may be output via the Output function 313 to the MSC 315, from which they may be forwarded to the BSs 321. The individual tunable radios 322 included in the BSs may then be tuned to the proper frequencies in accord with the assignment of radio channels determined by the assignment process.

I. METHODOLOGY OF INVENTION

A. GENERAL

The methodology for the invention herein is presented in a plurality of embodiments, each directed to a novel method for managing neighbor channel interference toward the achievement of an overall S/I ratio goal. As will be apparent from the specific discussion of those embodiments, each embodiment may be implemented independently, but most are also capable of being implemented in combination with one or more other embodiments, as well as with embodiments of the methodologies disclosed in the cross-referenced companion applications.

The level of interference contributed by neighbor channel transmitters depends on the position of the subscriber units (generally, mobile or portable) relative to their base station (s), the level of power control exercised, and the direction of communication—i.e., whether transmission occurs from the base station to the subscriber unit (referred to herein as "down link"), or from the subscriber unit to the base station (referred to herein as "up link"). FIGS. 5 and 6 illustrate exemplary configurations for consideration of the impact of neighbor-channel interference. FIG. 5 illustrates a single cell with base station B, while in FIG. 6, two neighboring cells are illustrated, with base stations B1 and B2. In both figures, subscriber stations i and j are shown juxtaposed in various configurations relative to one another and to the base station (s). In all configurations the designation i indicates the serving subscriber unit, and the designation j indicates the subscriber unit operating on the nearest channel in the frequency spectrum, referred to as the neighbor channel. In the configurations of FIG. 6, serving subscriber unit i is served by base station B1 and neighbor-channel subscriber unit j is served by base station B2.

Figure 5A:
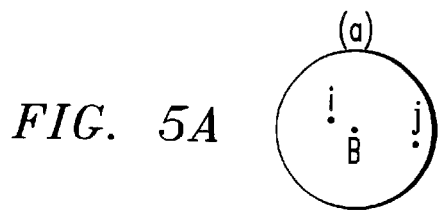
FIG. 5 illustrates schematically a single cell including its base station, with a served subscriber station and a potentially interfering subscriber station juxtaposed at various positions relative to each other and to the base station.
Figure 5B:
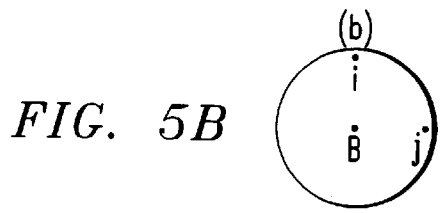
Figure 5C:
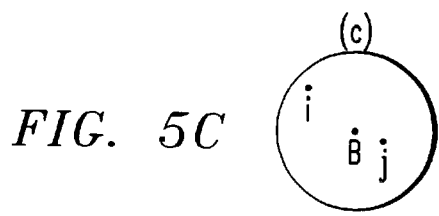

As an illustrative case, consider that all calls are served with equal power—i.e., no power control. Accordingly, down link neighbor-channel interference will be comparable in all the cases illustrated in FIG. 5 since all calls are served with the same power. The up link neighbor-channel interference, however, will be different in the three cases illustrated in FIG. 5. Because of signal attenuation as distance increases between transmitter and receiver, the signal strength received from subscriber unit i in FIG. 5(a) is stronger (due to its proximity to the serving base station) than the interfering signal from subscriber unit j. Hence up-link neighbor-channel interference for this configuration will be negligible. In the configuration of FIG. 5(b) the received serving signal is comparable to the interfering signal since the two subscriber units are the same distance from the base station. Finally, in the configuration of FIG. 5(c), up-link neighbor-channel interference is high because the interfering subscriber unit is closer to the base station than the serving subscriber unit.

If power control is used to reduce the power of calls closer to the base station, the experienced neighbor-channel interference changes. These changes can be illustrated by again considering the configurations of FIG. 5 and now assuming that power is adjusted so as to equalize the received serving signals. Then, up-link neighbor-channel interference would be comparable in all three configurations of FIG. 5 because the signal received from all subscriber units is the same, regardless of position of the unit relative to the base station. On the other hand, down-link neighbor-channel interference will be different for each of the three configurations. Power control causes down-link neighbor-channel interference to increase in FIG. 5(a) since the power of the interfering signal is higher than that of the serving signal. Power control does not alter down-link neighbor-channel interference in the configuration of FIG. 5(b), since both the served and neighbor-channel subscriber units are equidistant from the base station. However, in the configuration of FIG. 5(c), power control will cause down-link neighbor-channel interference to decrease. Thus, as can be seen, power control is generally beneficial in the up-link direction, but can often result in increased neighbor-channel interference when used in the down-link direction.

Figure 6A:
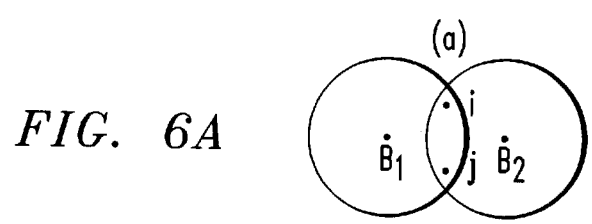
FIG. 6 illustrates schematically two neighboring cells, each with a base station, and with a served subscriber station and a potentially interfering subscriber station juxtaposed at various positions relative to each other and to the base stations.
Figure 6B:
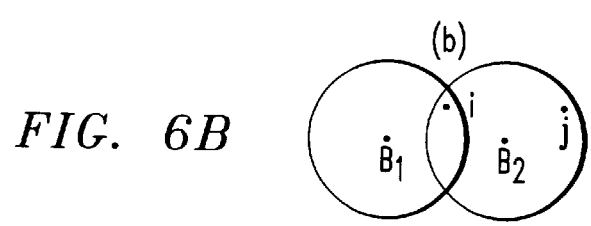
Figure 6C:
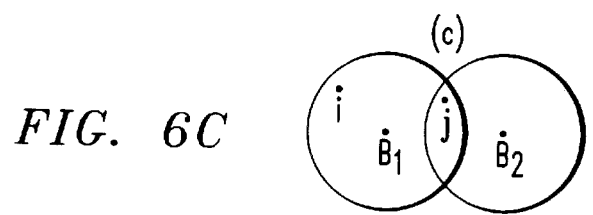

In the neighboring cells case shown in FIG. 6, and considering first the configuration of FIG. 6(a), subscriber unit i will experience neighbor-channel interference on both the down link (due to the competing signal from base station B2) and the up link (due to the competing signal from subscriber station j). As will readily be seen from the figures, comparable neighbor-channel interference will be experienced on the down link in FIG. 6(b) and on the up link in FIG. 6(c), but the neighbor-channel interference will be negligible on the up link in FIG. 6(b) and on the down link in FIG. 6(c).

In the companion cross-referenced case designated as M. Benveniste-7 (Ser. No. 08/580,570) certain relationships were developed among channel separation (between a serving channel and an interfering neighbor channel), received signal strength for serving and for interfering channels and the S/I ratio. Those relationships were then applied for an illustrative wireless communications application to develop two tables relating the realized S/I ratio and channel separation for various levels of comparative signal strength between a serving and an interfering signal. Those tables, which provide a useful reference for the interference management methods described hereafter, are reproduced below and can be characterized as follows:

Table 1 provides a trade-off between the S/I ratio realized by a served subscriber, T, and channel spacing, w, based on a design co-channel S/I threshold of 18 dB. As will be seen the first column represents the channel spacing given in multiples of the channel bandwidth, while the remaining ten columns give the realized S/I ratio (in dB) for a served subscriber, for different values of a ratio of signal strengths (in dB) for an interfering to a serving signal, P, as experienced by the subscriber.

Similarly, Table 2 provides, for different channel spacing values w, the design co-channel S/I ratio, Tc, needed to achieve a target overall S/I ratio, T—i.e. a trade-off between Tc and w for dB(T) equal to 18 dB.

As noted earlier, in the case of no power control being applied and both subscriber units i and j being served by the same base station (i.e., the configuration of FIG. 5), the down-link interfering and serving signals will be comparable, because of the equal power with which each signal is transmitted from the base station. Thus, the ratio of the interfering signal to the serving signal, P, is equal to 1 and dB(P) is equal to 0. As will be seen from Table 1, if adjacent channel use were allowed, the S/I ratio would drop to 16.23 dB, which represents 67 per cent of the target value of 63.1 (18 dB). Setting channel spacing w equal to 2 is sufficient to reclaim most of the S/I drop caused by neighbor-channel interference—an S/I ratio increase from 16.23 to 17.99 dB. A comparable condition occurs when subscriber units i and j are served by different base stations if the serving subscriber unit i is near the common boundary between the two cells, regardless of the position of the interfering subscriber unit j, as illustrated in FIGS. 6(a) and 6(b). However, if subscriber unit i is further away from the interfering base station B2 than from its serving base station B1, as illustrated in FIG. 6(c), the P ratio will be less than 1, and dB(P) becomes negative. Thus the impact of adjacent channel use on the S/I ratio is less. For instance, at a dB(P) value of −5 dB, Table 1 shows that the realized S/I ratio will be 17.36 dB, which represents 86 per cent of the design co-channel S/I ratio of 18 dB. For dB(P) equal to −10 dB, a 17.79 dB S/I ratio is realized, which represents 95 per cent of the design co-channel S/I ratio. Alternatively, this can be characterized as the value realized by the S/I ratio if neighbor-channel interference is limited to 5 per cent of the combined co-channel plus neighbor-channel interference. Accordingly, a value of P may be defined for which adjacent-channel interference becomes acceptable. That defined value is designated herein as Pa and in the exemplary case described is equal to −10 dB.

Considering the trade-off between w and Tc in Table 2, for the case of dB(P)=0, it can be seen that increasing the channel spacing from 1 to 2 would allow one to plan for a co-channel S/I ratio of 18.01 dB, instead of 21.03 dB. Additionally, it will be seen that, if the spacing were increased above 2, one would gain little in terms of the co-channel interference bound and, hence, in terms of capacity.

For the power control case, it has been shown that power control on the down link exacerbates the impact of neighbor-channel interference. Consider the particular case of power control being applied on the down link to reduce the signal strength of subscriber units closer in. In this case, P would be equal to the difference in power reduction of the signals serving the two subscriber units. The worst case occurs when the power of the signal serving subscriber unit i is reduced substantially, and the serving subscriber unit j operates at maximum power, as is illustrated by the configuration of FIG. 5(a). Table 1 shows that, even though the design co-channel S/I ratio is 18 dB, the realized S/I ratio becomes negative when down-link power is reduced by 28 dB for the near-end subscriber unit. It takes a channel spacing of 3 to achieve a 17.79 dB S/I ratio. In Section B1 hereafter, a novel Mixed Power Control Methodology is disclosed which will permit the partial use of down-link power control without increasing channel spacing beyond the value of 2, while still maintaining a reasonable S/I ratio.

B. NEIGHBOR-CHANNEL INTERFERENCE MANAGEMENT METHODOLOGIES

In the sections following, three novel interference management methodologies are described which provide reduced neighbor channel interference relative to that achieved by prior art methods. These new interference management methodologies, each of which constitutes an embodiment of the invention, are designated as Mixed Power Control, Directed Assignment, and Mixed Power Control With Directed Assignment.

B1. Mixed Power Control

In the prior discussion of the relationship between the application (or non- application) of conventional power control methods and neighbor channel interference experienced by a served subscriber, it was shown that such interference varied with the direction of transmission (downlink or uplink) as well as with the location of the served subscriber unit relative to other nearby subscriber units, and to the serving and/or other nearby base stations. A novel mixed power control methodology is described below which significantly ameliorates those variations. As will be seen, this mixed power control methodology may be implemented independently, but it may also be incorporated with other novel interference management methodologies described herein and in the companion cross-referenced applications.

It is believed that this novel mixed power control methodology is better understood by separately treating the downlink and uplink cases and the description of the methodology is accordingly so divided.

(a) Downlink Power Control

It was shown in the general discussion of power control that application of a conventional power control policy on the down link—i.e., reduction of the received signal strength for those subscriber units nearer to the base station—exacerbates the impact of neighbor-channel interference. In such a case, the interfering-to-serving signal strength ratio, P (in dB), would be equal to the difference in power reduction of the signals serving the two subscriber units. The worst case occurs when the power of the signal serving subscriber unit i is reduced substantially, and the signal serving subscriber unit j operates at maximum power, as would be the case shown in FIG. 5(a). In the exemplary case reflected in Table 1, it can be seen that, even with a design co-channel S/I ratio of 18 dB, the realized S/I ratio becomes negative when down-link power is reduced by approximately 28 dB for the near-end subscriber unit where co-channel spacing is used—a realistic reduction in this configuration.

As shown hereafter, a reasonable S/I ratio can be achieved using power control and without increasing channel spacing beyond the value of 2—which is generally needed without power control—if the magnitude of power reduction is restricted. From Table 1 it can be seen that, when the difference in signal strengths between an interfering and a serving signal, P in dB, or equivalently, the relative difference in power reduction for the two subscriber units, is less than 14 dB, the impact on the S/I ratio is small: a 17.79 dB S/I ratio or better can be realized with a channel spacing of 2. Accordingly, by limiting power control so as to maintain the received signal strength for a served subscriber no more than 14 dB below the level, at the served subscriber location, of an interfering signal, a channel spacing of 2 can be maintained with negligible neighbor channel interference. This constraint on the relative power control differential is herein called the limiting power control ratio and will be reference from time to time by the designation: $\gamma_M$. In the exemplary case depicted by Table 1, $dB(\gamma_M)$ is −14 dB.

Figure 7A:
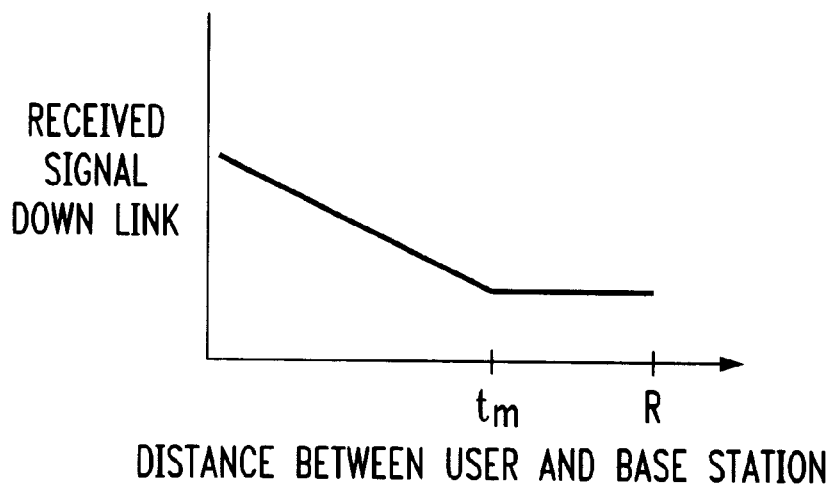
FIG. 7 provides a graphical depiction of the mixed power control policy of the invention.

In an illustrative embodiment of this mixed power control methodology, power control would be applied for subscriber units located between a cell's periphery and a point on the cell's radius where a signal reduced by $\gamma_M$ equals the signal received at the cell's periphery. The distance along the cell's radius from the base station to the point at which a signal reduced by $\gamma_M$ equals the signal received at the cell's periphery is defined as $l_M$. Thus power control would be applied for a subscriber unit located between $l_M$ and the cell periphery. FIG. 7A provides a graphical depiction of the down-link received signal as a function of the subscriber unit distance from the base station for this illustrative embodiment of the mixed power control methodology.

(b) Uplink Power Control

Unlike the downlink case, it has been seen that power control is generally helpful in reducing neighbor channel interference for the uplink direction. Nonetheless, as described hereafter, application of the mixed power control methodology of the invention for the uplink case permits the elimination of power control in certain regions of a cell without adversely affecting neighbor channel interference.

With up-link communications, the value of P can be reduced with power control and dB(P) becomes the difference in signal attenuation between the serving and interfering signals minus the difference in power reduction. This relationship and its impact can be illustrated by a configuration where the difference in signal attenuation between two subscriber units transmitting to a base station is 40 dB, and the difference in received signal levels due to power reduction is 12 dB. Then dB(P) would be: 40−12=28 dB. Based on a design co-channel S/I ratio of 18 dB and a channel spacing of 2, Table 1 shows that a 14.46 dB S/I ratio would be realized. If, on the other hand, the power reduction difference were increased to 26 dB, dB(P) would be 14 dB, and the total S/I ratio would be 17.79 dB, for a channel spacing of 2.

Figure 7B:
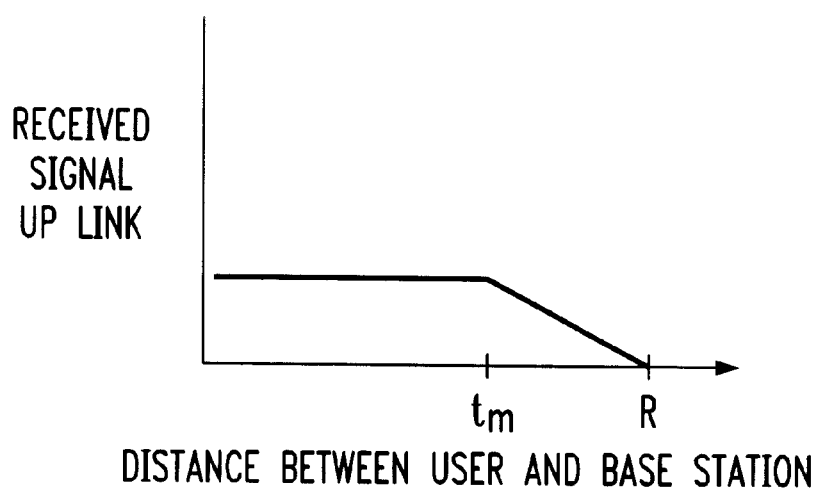

From this relationship it follows that, since negligible neighbor-channel interference will be caused by a dB(P) value of 14 dB or less with a channel spacing of 2, power control need not be applied to a potentially interfering subscriber unit experiencing high signal attenuation—e.g., a subscriber unit near the boundary of a cell. Only subscriber units with signal attenuation of 14 dB below the maximum possible attenuation in the cell need have their signals reduced. That is, power reduction need only be applied for subscriber units located between the base station and a point on the cell's radius, $l_M$, at which the ratio of the received signal strength relative to the minimum signal strength in the cell is $\gamma_M^{-1.4/}$ In the exemplary case of Table 1, dB($\gamma_M^{-1}$) is 14 dB. FIG. 7B provides a graphical depiction of the up-link received signal as a function of the subscriber unit distance from the base station for this mixed power control methodology.

To estimate the power reduction capability needed on the up link with the mixed power control methodology, for a given channel spacing, the highest value of P to be encountered with some statistical significance is needed. The inventor has shown in a related article [M. Benveniste, "Managing Neighbor Channel Interference in Channelized Cellular Systems," forthcoming] that with a probability of 0.995, the relative signal strength dB(P) is less than or equal to 40 dB without power control if the propagation loss coefficient is 4 (a generally accepted value for mobile radio systems). Hence, a power reduction capability −dB($\phi^M$) of 26 dB would be adequate for a channel spacing of 2, since: Maximum Attenuation (40) −dB(P) Threshold (14)= Maximum Power Reduction (26 dB).

As can be seen from Table 2, a range of power control options are presented. Examples of such options would include a reduction of the near-end subscriber unit's power by 20 dB while leaving the far-end subscriber unit at maximum power. For a channel spacing of 2, the design co-channel S/I threshold would have to be 18.97 dB. Another possibility would be a reduction of power at the near end by 26 dB (while operating the far end unit at maximum power). This would produce a dB(P) value of 14 (40−26), which for a channel spacing of 2 requires a design co-channel S/I threshold of 18.22 dB.

As will also be apparent, for the described embodiments of the mixed power control methodology, power control requirements are selected so that channel spacing requirements are minimum. Other applications of the methodology, of course, exist. For example, if a greater power reduction range is desirable, the channel spacing must increase. This idea is pertinent in dynamic channel assignment algorithms that employ power control as a means of increasing capacity.

B2. Directed Assignment

A surrogate for adjacent-channel interference is the number of adjacent-channel conflicts, which arise when two adjacent channels are used simultaneously in the same or abutting cells. While it will be apparent from the preceding discussion that not every adjacent-channel conflict gives rise to adjacent-channel interference, a generalization can still be made that a reduction in the number of adjacent-channel conflicts decreases the likelihood of adjacent-channel interference.

The embodiment of the invention described in this section is directed to an objective of minimizing adjacent channel interference through a reduction of the probability of adjacent channel conflicts. The approach may be applied to both regular and non-regular, fixed and flexible channel assignment, and to sectorized and omni-directional cells. It may also be combined with other adjacent-channel interference reduction approaches.

The Directed Assignment methodology will be understood by use of a simple example from regular fixed channel assignment. Consider four cells assigned channel sets: A, B, C, and D, as shown in FIG. 8. The channels comprising each set are adjacent to the channels of two of the other three sets, and the further assumption is made that each cell abuts cells assigned the other three channel sets. Consider further that for this illustrative example, there are 24 channels available, and the four cells in question have, respectively, 5, 3, 4, and 3 calls in progress each. If all calls were assigned to the lowest-number channels, as depicted in FIG. 8A, then there would be 4 adjacent channel conflicts in cell A, 3 in B, 3 in C, and 3 in D. In order to reduce the number of adjacent channel conflicts, all calls in cells A and C are moved to the lowest-number channels available, and the calls in cells B and D are moved to the highest-number channels, the configuration depicted in FIG. 8B. Consequently, there is a greater channel separation between active channels in cells containing adjacent channels. As seen in FIG. 8B, the number of adjacent channel conflicts decreases to: 2, 2, 1, and 2, for the four cells respectively.

The steps followed in carrying out the Directed Assignment methodology are as follows:

1. The available channels are distributed among channel sets so that each set has a label, "+" or "−", and any two sets with adjacent channels have opposite label.
2. Each cell is also assigned a label, "+" or "−".
3. A cell may use channels from a set(s) assigned the same label as the cell.
4. Cells with a "+" label assign their users to the lowest-number channel available, while cells with a "−" label place their users to the highest-number channel available.

Step 4 increases the channel separation of active channels in cells with opposite labels. Since adjacent channels can be found only in cells with opposite labels, by Step 1, the likelihood of adjacent-channel conflicts is decreased.

Two options are available to push calls to either end of a channel set. One would be to move the call from the highest-number channel in a "+" cell (or the call from the lowest-number channel in a "−" cell) to the channel of a departing call in that cell. Thus, there would be at most one channel re-arrangement per call termination or hand-off. Another way to keep users to the proper end of the channel set without channel re-arrangements would be to assign incoming calls to the lowest-number idle channel for a "+" cell, or to the highest-number idle channel for a "−" cell.

The Directed Assignment methodology applies both to fixed and flexible channel assignment. However, the interpretation of channel sets differs in the two approaches. In fixed channel assignment the channel sets are the mutually disjoint groups of channels dedicated to the different cells. In fixed regular channel assignment, where all channel sets are of equal size, Step 1 requires that there be an even number of channel sets.

In flexible channel assignment, there would be two channel sets, (in order to comply with adjacent channel use restrictions). Each would be assigned a "+" or "−" label. For example, the channel set of odd-number channels could be given the "+" label, and the set of even-number channels the "−" label. Since "+" label cells favor low channel numbers, and "−" label cells favor high channel numbers, the separation between the busy channels of cells with different labels increases in low traffic conditions. As adjacent channels may be used only in cells of different labels, the probability of adjacent channel conflicts is decreased.

B3. Mixed Power Control With Directed Assignment

Figure 9:
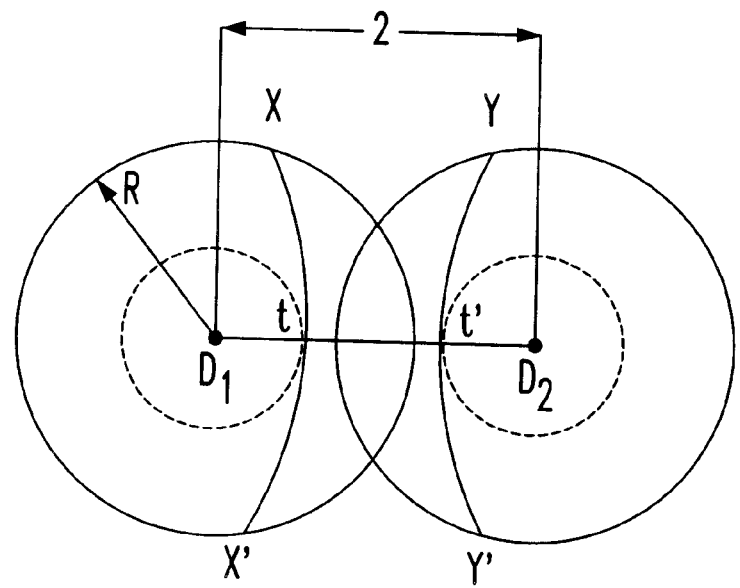
FIG. 9 depicts a no interference region in neighboring cells.

For a power control policy characterized by no power control on the down link, and full power control on the up link, it has been shown that a channel spacing of 2 would be adequate to reduce the impact of neighbor-channel interference within a cell with the use of that power control policy. In the companion cross-referenced application designated Benveniste-8 (Ser. No. 08/580,568), it was shown that, for such a power control policy, there is a region in a cell wherein the impact of adjacent-channel interference from a neighbor cell is negligible on the down link. Also, there is a similar region, wherein subscriber units will cause negligible up-link adjacent-channel interference to a neighbor cell. Specifically, with reference to FIG. 9 (which corresponds to FIG. 7 of the Benveniste-8 application), a subscriber unit positioned to the left of contour XX' in cell 1 would not experience downlink interference from adjacent channels used in cell 2. Similarly, a subscriber unit positioned to the right of contour YY' will not cause up-link adjacent channel interference to cell 1.

It has also been shown that the opposite power control practice—that is, full power control on the down link, and no power control on the up link—increases the neighbor-channel interference experienced from users within the same cell, and should be avoided. However, a novel power control policy, characterized as "mixed power control", was described in Section B1 which permits limited down-link power control while maintaining neighbor-channel interference within acceptable limits. Specifically, one could use power control on the down link outside a radius $l_M$, corresponding to a maximum power reduction range $\gamma_M$—in the described illustrative case, $l_M$ is 0.4467 R, corresponding to a power reduction of 14 dB. Similarly, under the described mixed power control policy, if power control were applied on the up link only inside a radius $l_M$, the received signals would equalize at a level 14 dB above the lowest received signal in a cell. The received signal is plotted in FIG. 7 as a function of user-to-base-station distance (in log scale) for both communications directions. With this mixed power control policy, a channel spacing of 2 within a cell would be adequate.

Figure 10:
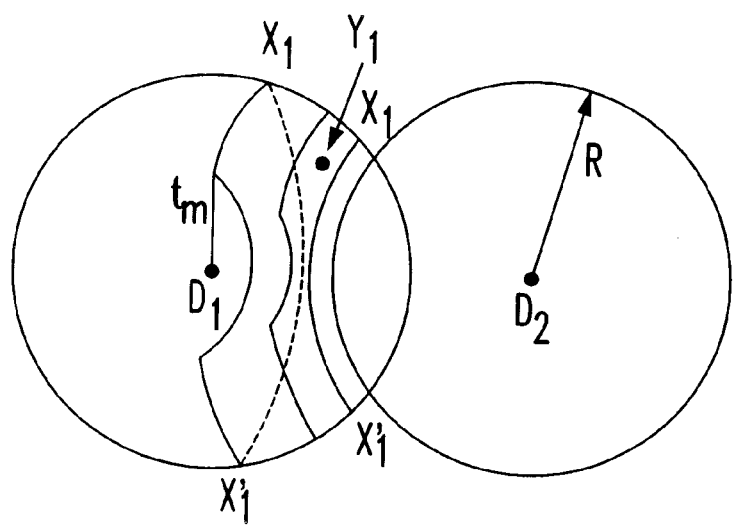
FIG. 10 depicts an application of the Mixed Power Control With Directed Assignment methodology of the invention.

As will be appreciated, the incentive for deviating from the pure power control policy is to reduce the impact of adjacent channel use in neighboring cells, and thus drop adjacent channel restrictions for neighboring cells. Consider an application of the above-described mixed power-control policy in the neighbor cell arrangement depicted in FIG. 9. Instead of the single contour XX', as shown in that figure, defining the region vulnerable to adjacent-channel interference from the neighboring cell, there will be a family of such contours Xk Xk', one for each power level k used in the neighbor cell, as illustrated in FIG. 10. Contour X1 X1' corresponds to the strongest power signal used in cell 2. The contours Xk Xk' spread both to the right and to the left of contour XX'. The shift to the right decreases the portion of users in cell 1 experiencing adjacent-channel interference from a user in cell 2 served at power level k, but the shift to left increases it. Now, however, users in the two cells can be matched to operate on adjacent channels in a way that reduces the likelihood of adjacent-channel interference.

To illustrate how user matching can reduce the probability of adjacent-channel interference, consider user M1 in FIG. 10. Without power control, M1 would experience adjacent-channel interference regardless of the position of the user on the adjacent channel. With power control, on the other hand, M1 can be matched with a user in cell 2 served with a low power level k, so that there is no adjacent-channel interference. Hence, the probability of adjacent-channel interference can be reduced through a combination of limited power control and selective matching of adjacent channel users in neighbor cells. A channel matching algorithm for carrying out this objective is described below.

The range of power control determines the spread of the Xk Xk' contours. The optimal range of power control that minimizes adjacent-channel interference probability should be determined in conjunction with the specific channel matching algorithm employed. It will be understood that the range of down-link power control cannot go beyond $\gamma_M$.

As previously noted, the inventor has shown that the up-link requirements for achieving no adjacent-channel interference are symmetric to the down-link requirements described above if complementary power control policies are used on the two links. [M. Benveniste, "Managing Neighbor Channel Interference in Channelized Cellular Systems," id.] That is, if up-link power control is restricted inside the circle of radius $l_M$, and there is no power control outside that circle, then there would be a family of contours Yk Yk', for k corresponding to the different power levels of the users in cell 1, that define regions where a user in cell 2 would cause no up link interference to the corresponding user in cell 1. These contours are mirror images of the contours Xk Xk' drawn for the down link case in cell 1. As also explained by the inventor in the reference article, a user that does not cause up-link adjacent-channel interference to an adjacent-channel user in a neighbor cell will not be subject to down link adjacent-channel interference from the neighbor-cell user. Due to the symmetry in the conditions for no adjacent-channel interference it is sufficient to analyze user-matching algorithms for one communication direction only. Accordingly, the described methodology in the following sections is focused on the down link. The performance on the up link will be comparable.

(a) Description of Methodology

As shown in the preceding section, the probability of adjacent-channel interference can be reduced by proper matching of adjacent-channel users in neighbor cells. The user matching problem is a complex combinatorial optimization problem. However a good solution of that problem is reached by a simple heuristic algorithm described hereafter. The approach begins by ordering users in each cell. The ordered users are assigned the available channels in order of increasing (or decreasing) channel-number, thereby matching adjacent channel users. The objective thus becomes the determination of a criterion for ranking the users in a cell such as to minimize the probability of adjacent-channel interference. The user's distance from the serving base station is selected as the ranking criterion.

The logic for selecting the distance between user and base station as the ranking criterion can be seen by considering the two-cell example in FIG. 10. In the discussion hereafter, the following notation is used:

$m_i$ distance of subscriber unit $M_i$ from its own base station $n_i$ distance of subscriber unit $M_i$ from the neighbor base station. In the inventor's referenced article, it is shown that, for the application of power control in the downlink direction, adjacent-channel interference will not be incurred when:

$$P=[m_2/n_1]^\gamma \leq P_a$$

According to that relationship, in order to reduce down-link adjacent-channel interference in cell 1, high $m_2$ values should be matched with high $n_1$ values. Similarly, in order to minimize adjacent-channel interference in cell 2, high $m_1$ values should be matched with high $n_2$ values. But, in general, the channel assignments resulting from these two criteria will be different. To obtain a unique channel assignment, users in each cell must be ranked by the same criterion. If the distance from the serving base station is used, high $m_1$ values are matched with low $m_2$ values, and vice versa. Using distance as the ranking criterion decreases adjacent-channel interference because, in the area of cell 1 that is most vulnerable to adjacent-channel interference, n1 decreases as m1 increases, and vice versa.

The methodology of the invention can be generalized to deal with adjacent-channel use by more than one neighbor cells, as follows:

1. The available channels are distributed among channel sets so that each set has a label, "+" or "−", and any two sets with adjacent channels have opposite label.
2. Each cell is assigned a label, "+" or "−".
3. A cell may use channels from a set(s) assigned the same label as the cell.
4. Users in each cell are assigned in order of decreasing distance from the serving base station. Cells with a "+" label assign their users to the lowest-number channel first, while the cells with a "−" label place their users to the highest-number channel first.

Since adjacent channels are used only by cells of opposite label, by Steps 1 through 4, the assignment of high-power users to low-number channels in "+" cells, and to high-number channels in "−" cells, increases the channel separation between them. Consequently, a high-power user will operate either next to an idle channel (in low traffic conditions), or next to a channel assigned to a neighbor cell user near its base station. The probability of adjacent-channel interference between neighbor cells is thus reduced.

As will be seen, the methodology here resembles in some respects the previously described Directed Assignment methodology. However, while Directed Assignment has no impact on adjacent-channel interference in congestion conditions, the use of power control with proper user matching still reduces the probability of adjacent-channel interference.

As will be appreciated, the effectiveness of the matching procedure described above will depend on how spread out the contours Xk Xk' are. This, in turn, depends on the range of power control, which is selected to minimize the probability of adjacent-channel interference.

As in the case of Directed Assignment, users can be packed on either end of the available channel set in two ways. One involves channel re-arrangement upon call departure; the other doesn't. Further channel re-arrangement may be necessary in order to maintain a proper ranking of the users, which may change as users move. Alternatively, channel re-arrangement may be postponed until adjacent-channel interference is observed, thus reducing the number of re-arrangements needed.

(b) Application of Methodology

The methodology described herein can be used with both fixed and flexible channel assignment. In this section exemplary applications of that methodology from fixed regular channel assignment are described. An example of the use of this method with flexible channel assignment appears in M. Benveniste, A. G. Greenberg, and P. E. Wright "On dynamic channel assignment in wireless systems: Extensions of Ordered Borrowing", forthcoming.

Figure 11:
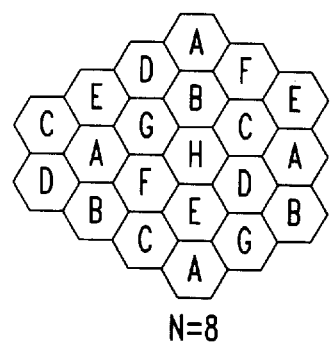
FIG. 11 depicts an N of 8 omni-directional cell layout.

Consider a system of omni-directional cells repeated by the N of 8 pattern shown in FIG. 11. The assumption is made that the channel sets are constructed by the horizontal method and, therefore, that each cell shares a border with one other cell assigned adjacent channels. Given 400 channels, each cell would be assigned 50 channels. Table 3 shows the impact of channel matching on adjacent-channel interference as a function of offered load. If channels were assigned randomly, it has been determined by simulation that the probability of an adjacent channel conflict (ACC) is 79 per cent when offered a load of 40.3 erlangs (which gives a blocking probability of 2 per cent). The probability of adjacent-channel interference (ACI) is 10.6 per cent. When the Directed Assignment methodology is applied, the probability of adjacent channel conflict drops to 73 per cent, and the probability of adjacent-channel interference becomes 10.1 per cent, for the same offered load and blocking probability. If power control with user matching were used, the probability of adjacent-channel interference would be reduced to 0.5 per cent.

When the offered load is increased to 58.5 erlangs (when the blocking probability increases to 20 per cent), the probability of adjacent-channel conflict is 93 per cent, and the probability of adjacent-channel interference is 12.9 per cent, when channels are assigned randomly. With Directed Assignment, the probability of adjacent-channel conflict remains 93 per cent, and the probability of adjacent-channel interference becomes 12.8 per cent, for the same offered load. As anticipated, the impact of Directed Assignment diminishes in congestion. If power control with user matching are used, the probability of adjacent-channel interference drops to 2.8 per cent.

Figure 12:
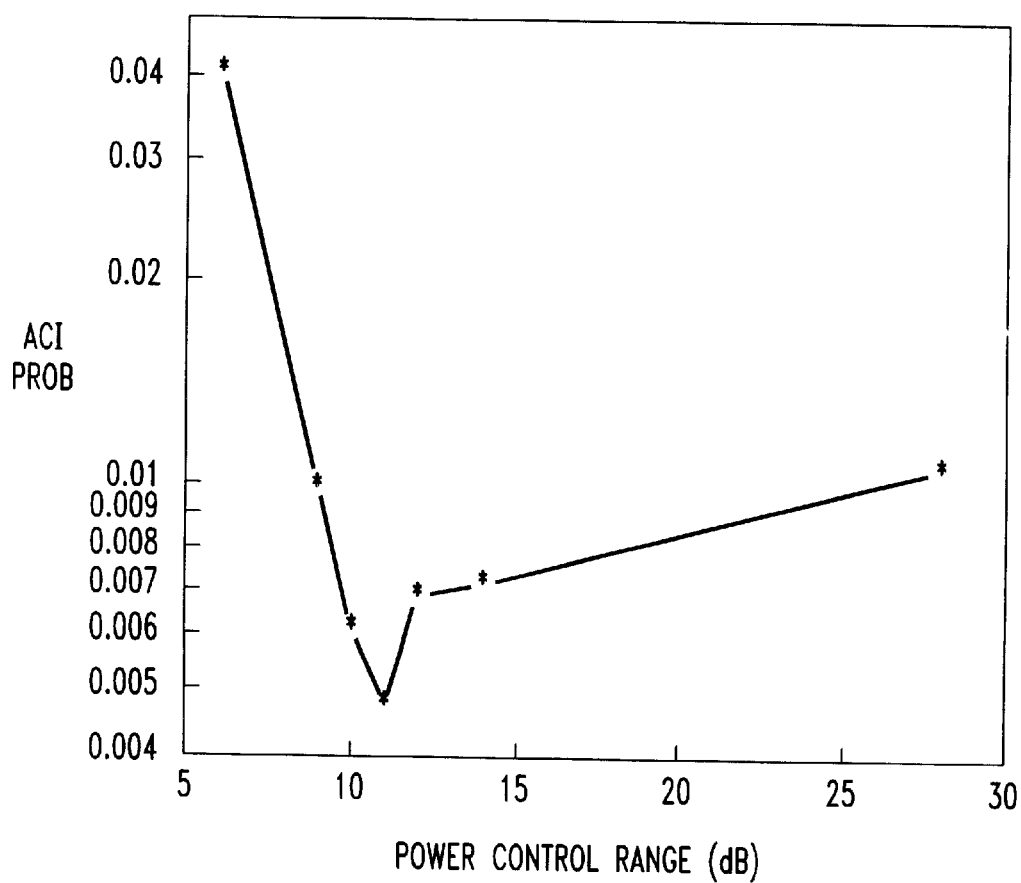
FIG. 12 shows the probability of adjacent channel interference as a function of power control range for the Mixed Power Control With Directed Assignment methodology of the invention.

A power range of 11 dB was used in obtaining the above results. This value yields the lowest adjacent-channel interference probability for an offered load of 40.3 erlangs per cell, as seen in FIG. 12, where adjacent-channel interference probability is plotted as a function of power control range.

II. CONCLUSION

Herein has been disclosed a plurality of novel methodologies for managing neighbor-channel interference. These methods, and combinations thereof, can be employed with fixed and flexible, regular and non-regular channel assignment. And, they are applicable to all channelized systems whether they employ frequency-division multiple access or hybrid frequency-division/time-division multiple access.

As shown in the discussion, the methods disclosed herein can be easily combined, as well as being combinable with embodiments of the inventions claimed in the cross- referenced companion applications. An example that illustrates the potential for synergy among the several disclosed channel management methodologies even better is that of a cellular system on an irregular grid, with a non-uniform traffic distribution, comprised of a mix of sectorized and omni-directional cells. An objective is to find an optimal non-regular channel assignment that respects adjacent channel restrictions. Odd/even Cell Designation (from companion application M.Benveniste-7) can be used to ensure compliance with adjacent channel restrictions within a cell. Mixed Power Control with Directed Assignment will reduce adjacent channel interference between neighbor cells. And Vertical Channel-Set Construction (from companion application M.Benveniste-7) will ensure that sectors of the same cell do not use adjacent channels. Finally, any channel borrowing scheme that uses channels according to a cell's odd/even designation and a sector's orientation can make this channel assignment dynamic, without violating adjacent channel restrictions.

2. MIXED POWER CONTROL

The relationship between the application of power control methods and neighbor channel interference experienced by a user was discussed above and it was shown that such interference varied with the direction of transmission (down-link or up-link) as well as with the location of the user relative to other nearby users, and to the serving and/or other nearby base stations. A mixed power control methodology was presented, which may be implemented independently, or incorporated with other interference reduction techniques.

2.1 Down-link Power Control

It was shown that application of a conventional power control policy on the down link—i.e., reduction of the received signal strength for those subscriber units nearer to the base station—exacerbates the impact of neighbor-channel interference [discussed above]. A reasonable S/I ratio can be achieved, however, using power control and without increasing channel spacing beyond a specified value, if the magnitude of power reduction is restricted. For example, by limiting power control so as to maintain the received signal strength for a user no more than 14 dB below the level, at the served user location, of an interfering signal, a channel spacing of 2 can be maintained with negligible neighbor channel interference. This constraint on the relative power control differential is called the limiting power control ratio and will be referenced from time to time by the designation: $X_M$.

Figure 13A:
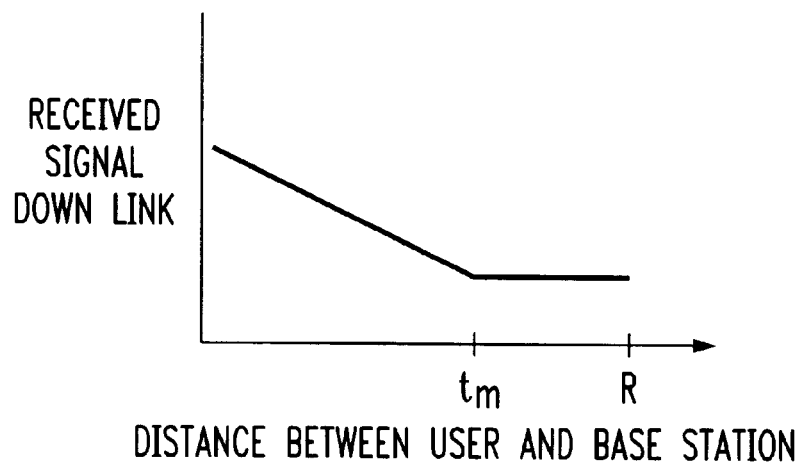
FIG. 13 illustrates Mixed power control policy.
Figure 13B:
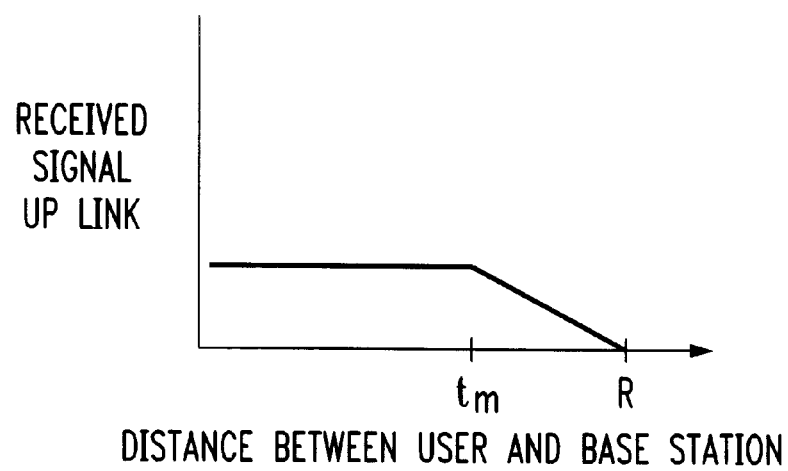

In mixed power control, power control would be applied on the down link for subscriber units located between a cell's periphery and a point on the cell's radius where a signal reduced by $X_M$ equals the signal received at the cell's periphery. The distance along the cell's radius from the base station to the point at which a signal reduced by $X_M$ equals the signal received at the cell's periphery is defined as $l_M$. Thus power control would be applied for a subscriber unit located between $l_M$ and the cell periphery. FIG. 13 shows the down-link received signal as a function of the subscriber unit distance from the base station for mixed power control.

2.2 Up-link Power Control

Unlike the down-link case, power control is generally helpful in reducing neighbor channel interference for the up-link direction. Nonetheless, as shown in reference [discussed above], the elimination of power control in certain regions of a cell is possible without adversely affecting neighbor channel interference. With up-link communications, the value of P, the interfering-to-serving signal strength ratio, can be reduced with power control and dB(P) becomes the difference in signal attenuation between the serving and interfering signals minus the difference in power reduction. For example, negligible neighbor-channel interference will be caused by a dB(P) value of 14 dB or less with a channel spacing of 2, and therefore power control need not be applied to a potentially interfering subscriber unit experiencing high signal attenuation—e.g., a subscriber unit near the boundary of a cell. Only subscriber units with signal attenuation of 14 dB below the maximum possible attenuation in the cell need have their signals reduced. That is, power reduction need only be applied for subscriber units located between the base station and a point on the cell's radius, $l_M$, at which the ratio of the received signal strength relative to the minimum signal strength in the cell is $X_{M^{**}}$. FIG. 13 shows the up-link received signal as a function of the subscriber unit distance from the base station for mixed power control.

The mixed power control requirements are selected to correspond to specific channel spacing requirements. If a greater power reduction range is desirable, the channel spacing must increase. This idea is pertinent in dynamic channel assignment algorithms that employ power control as a means of increasing capacity.

3. DIRECTED ASSIGNMENT—DA

The objective of Directed Assignment is to reduce the probability of interfering-channel conflicts. Directed channel assignment was proposed in reference [discussed above] as a means of reducing the probability of adjacent-channel conflicts. That is, the number of instances where adjacent channels are used concurrently by neighboring cells. In this section we show how it can be used to reduce the probability of co-channel interference. With co-channel interference, the reduction of instances where the same channel is used concurrently by neighboring cells is sought. Naturally, interference conflicts cannot be avoided in congestion conditions, since all channels are in use.

The approach applies to both regular and non-regular, fixed and dynamic channel assignment, and to sectorized and omni-directional cells. It can be combined with other interference reduction approaches.

We illustrate the method with a simple example from fixed channel assignment. Suppose that there 12 channels available, and they are partitioned into two channel sets. We consider four cells assigned channel sets 1 and 2 as shown in Table 7. Suppose that the four cells in question have, respectively, 5, 3, 4, and 3 calls in progress each. If all calls were assigned to the lowest-number channels, then, there would be 4 interfering channel conflicts between cells B and C, and 3 between cells A and D. In order to reduce the number of interfering channel conflicts, we move all calls in cells A and C to the lowest-number channels available and the calls in cells B and D to the highest-number channels. The number of interfering channel conflicts decreases to: 3, 0, 3, and 0, for the four cells respectively, as seen in Table 7(b), because of the greater channel separation between active channels in cells containing interfering channels. The method is outlined below:

1. Each cell is assigned a label, '+' or '−' in a way that any two interfering cells have opposite label.
2. Cells with a '+' label assign their users to the lowest-number channel available, while the cells with a '−' label place their users to the highest-number channel available.

Step 2 increases the channel separation of active channels in cells with opposite labels. Since interfering cells have opposite labels, by Step 1, the likelihood of interfering channel conflicts is decreased.

No special ordering of the channels is imposed by Directed Assignment when applied to co-channel interference reduction (unlike the case of adjacent-channel interference reduction, whereby channels were listed by their channel number). A special ordering may be required, however, by the channel assignment algorithms with which Directed Assignment may be combined. The technique requires that the cells with the '−' label assign their channels in the opposite order from that followed by the cells with the '+' label.

When the call initiation and termination times are random, there are two ways to push calls to either end of a channel set. One would be to move the call from the highest-number channel in a '+' cell (or the call from the lowest-number channel in a '−' cell) to the channel of a departing call in that cell. This would result in at most one channel re-arrangement per call termination or hand-off. Another way to keep users to the proper end of the channel set, without channel re-arrangements, would be to assign incoming calls to the lowest-number idle channel for a '+' cell, or to the highest-number idle channel for a '−' cell. Naturally, there is a trade-off between the two approaches. While the second method avoids channel re-arrangement, its packing of calls is less responsive to the creation of vacancies upon call departure, as it may leave idle a channel whose adjacent channels are also idle.

3.1 Application

Directed Assignment can be combined with different channel assignment algorithms, and it applies to both fixed and dynamic channel assignment. The interpretation of channel sets differs in different algorithms, and Directed Assignment may be applied selectively to only some of the channel sets. In the fixed channel assignment example above, there was a single channel set associated with each cell. Examples that illustrate these differences are given below: one comes from re-use partitioning in fixed channel assignment and another from dynamic channel assignment.

3.1.1 Re-Use Partitioning with Directed Assignment

Re-use partitioning has been used to increase capacity by trading off higher S/I ratios enjoyed closer to the base station for a shorter re-use distance or, equivalently, a lower re-use factor [12]. Consider the case where the re-use factor of the inner server group is chosen so that this group experiences no interference conflicts, while the outer server group does. In that case, the assignment of channels to users in the inner server group requires no special attention. Directed Assignment can be used in order to reduce the interference conflicts in the outer server group. It causes the separation between the busy channels in the outer server groups to increase in low traffic conditions, and the probability of interfering channel conflicts to decrease.

Table 5 illustrates the use of Directed Assignment with re-use partitioning. Two channel sets are assigned to each cell, one for the inner server and the other for the outer server. Two cells are considered. Both the inner server and the outer server channel sets are the same for the two cells. No interference is expected for users served by the inner group [users within a given range from the base station], but two outer server group users in the two cells could experience interference if assigned the same channel. Each of the cells is assigned a '+' or '−' label. The '+' label cell has 6 users in the inner server group and 2 in the outer server group. The '−' label cell has 6 users in the inner server group and 3 in the outer server group. The order in which the two cells assign channels to users in the inner server group is unspecified. In the '+' label cell, the top 2 channels in the channel group were assigned. In the '−' label cell, the bottom 3 channels in the server group were assigned. Hence, there were no interfering channel conflicts.

3.1.2 Dynamic Channel Assignment with Directed Assignment

In some dynamic channel assignment algorithms, two channel sets could be associated with each cell: the "allocated" channels and the "accessible" channels. Users are assigned channels from the allocated set first. A channel from the accessible set will be selected only if it is impossible to assign an allocated channel. The composition of the two channel sets associated with each cell and the order in which channels are considered for assignment to users will depend on the particular the algorithm.

Each cell of two potentially interfering cells is assigned a '+' or '−' label. A '+' label cell will assign channels in the order the channels are specified, starting from the allocated set first and then from the accessible set. A '−' label cell will also assign channels from the allocated set first and mixed cell. As a result, the separation between the busy channels of cells with different labels increases in low traffic conditions, and the probability of interfering channel conflicts decreases.

Table 6 illustrates the Directed Assignment procedure used in conjunction with dynamic channel assignment. Consider two cells with potential to interfere with one another. Both have been assigned the same allocated and accessible channel sets, and the channels have been ordered as shown in Table 6. The dynamic channel assignment algorithm is such that it can avoid interference only in some instances, but not always, as shown in Table 6 where the two interfering cells are both using channel '3', '5', and '9'. There are no conflicts in the use of the accessible channel set as a result of directed assignment.

4. MIXED POWER CONTROL WITH USER MATCHING—MPCUM

The ideal power control policy is no power control on the down-link, and full power control on the up link. We also noted in Section 2 that the opposite power control practice—that is, full power control on the down link, and no power control on the up link—increases the neighbor-channel interference experienced from users within the same cell, and should be avoided, except when the practice is limited. It was shown that a channel spacing of 2 would be adequate to reduce the impact of neighbor-channel interference within a cell for the example considered in reference [discussed above]. In that case, one could use power control on the down link outside a radius $l_M$, corresponding to a maximum power reduction range $X_M$. In that example $l_M$ is 0.4467 R, corresponding to a power reduction of 14 dB. Similarly, if power control were applied on the up link only inside a radius $l_M$, the received signals would equalize at a level 14 dB above the lowest received signal in the cell. The received signal was plotted in FIG. 13 as a function of user to base station distance for both communication directions. With this policy, referred to as mixed power control, a channel spacing of 2 within a cell would be adequate.

4.1 No-interference Region

If the pure power control policy recommended in reference [discussed above] were followed, there would be a region in a cell wherein the impact of interference from a neighbor cell is negligible on the down link. Also, there is a similar region, wherein subscriber units will cause negligible up-link interference to a neighbor cell. Suppose we have two equal-size cells 1 and 2 covered by base stations $B_1$ and $B_2$, respectively, as illustrated in FIG. 14. Let us assume that there is no power control on the down link. In Appendix I, we derive the conditions that ensure no interference for a pair of subscriber units in neighboring cells. According to the condition in (I.2) of Appendix I, whether a subscriber unit experiences down-link interference from a neighbor cell depends only on its own position, and not on the position of the subscriber units in the neighbor cell. As shown in FIG. 14, one can draw a contour XX' to the left of which there is no interference experienced in cell 1 from channels used in cell 2. Let l be the shortest distance of contour XX' from $B_1$. If cell 1 were surrounded by neighbor cells that use interfering channels, there would be a circle of radius l, inside which a subscriber unit would remain unaffected by interference on the down link. We compute l from condition (I.2) as follows:

$$P = \left(\frac{l}{2r-l}\right)^\gamma = P_a$$

where 2r is the distance between the base stations. If 2r is equal to $\sqrt{3}$ R, where R is the cell radius, then $$l = \frac{\sqrt{3} R}{1 + P_a^{-1/\gamma}}$$

For instance, if $P_a$ is equal to 0.1 (dB(P)=−10), and γ equal to 4, l would be equal to 0.6234 R.

If we use full power control on the up link then, according to condition (I1.8) of Appendix I, there is a boundary YY', a distance l' to base station $B_2$, to the right of which subscriber units in cell 2 cannot cause significant interference to cell 1. Subscriber units inside the circle of radius l' would not cause up-link interference to a neighbor cell. Equivalence of conditions (I.2) and (I.8) of Appendix I ensures that YY' is a mirror image of XX', and l' is equal to l.

4.2 The Impact of Mixed Power Control on Interference from Neighboring Cells In the preceding section we saw that, for the pure power control policy recommended in reference [discussed above], there is a region in a cell wherein the impact of interference from a neighbor cell is negligible on the down link. Also, there is a similar region, wherein subscriber units will cause negligible up-link interference to a neighbor cell. The incentive for deviating from the pure power control policy is to further reduce the impact of interference between neighboring cells. Suppose that the above-described mixed power control policy was employed. Instead of the single contour XX', seen in FIG. 14, defining the region vulnerable to interference from the neighboring cell, there will be a family of such contours $X_k X'_k$, one for each power level k used in the neighbor cell, as illustrated in FIG. 15. Contour $X_l X'_l$ corresponds to the strongest power signal used in cell 2. The contours $X_k X'_k$ spread both to the right and to the left of contour XX'. The shift to the right decreases the portion of users in cell 1 experiencing interference from a user in cell 2 served at power level k, but the shift to the left increases it. Now, however, users in the two cells can be matched to operate on interfering channels in a way that reduces the likelihood of interference. To illustrate how user matching can reduce the probability of co-channel interference, consider user $M_1$ in FIG. 15. Without power control, $M_1$ would experience co-channel interference regardless of the position of the user on the same channel in cell 2. With power control, on the other hand, $M_1$ can be matched with a user in cell 2 served with a low power level k, so that there is no co-channel interference. Hence, the probability of co-channel interference can be reduced through a combination of limited power control and selective matching of co-channel users in neighbor cells. We describe such a channel matching algorithm in the following section.

The range of power control determines the spread of the $X_k X'_k$ contours. Since the shift to the right decreases the portion of users in cell 1 experiencing interference from a user in cell 2 served at power level k, and the shift to the left increases it, there is an optimal range of power control that minimizes interference probability. It should be determined for the specific problem at hand. Naturally, the range of down-link power control cannot go beyond $X_M$, as explained earlier in this section. As explained in Appendix I, the up-link requirements for no interference are symmetric to the down-link requirements described above if complementary power control policies are used on the two links. That is, if power control is restricted inside the circle of radius $l_M$, and there is no power control outside that circle, then there would be a family of contours $Y_k Y'_k$, for k corresponding to the different power levels of the users in cell 1, that define regions where a user in cell 2 would cause no up-link interference to the corresponding user in cell 1. These contours are mirror images of the contours $X_k X'_k$ drawn for the down-link case in cell 1. As explained in Appendix I, a user that does not cause up-link interference to an interfering-channel user in a neighbor cell will not be subject to down-link interference from the neighbor-cell user. Due to the symmetry in the conditions for no interference it is sufficient to analyze user-matching algorithms for one communication direction only. We will investigate the down link. The performance on the up link should be comparable.

4.3 The Method

As illustrated in the preceding section, the probability of interference can be reduced by proper matching of interfering-channel users in neighbor cells. The user matching problem is a complex combinatorial optimization problem. We solve it with a simple heuristic algorithm that performs reasonably well.

Our approach begins by ordering users in each cell. The ordered users are assigned the available channels in order of increasing (or decreasing) channel-number, thus, matching interfering channel users. The objective thus becomes to find a criterion for ranking the users in a cell such that it minimizes the probability of interference. The user's distance from the serving base station is the metric for ranking the users. The logic for selecting the distance between user and the serving base station as the ranking criterion can be seen by considering the example in FIG. 14. We consider two subscriber units $M_1$ and $M_2$, covered by base stations $B_1$ and $B_2$, respectively. We define the following notation:

$m_i$ distance of subscriber unit $M_i$ from its own base station $n_1$ distance of subscriber unit $M_i$ from the neighbor base station γ propagation loss coefficient It is shown in Appendix I that with full power control on the down-link direction, down-link interference will not be incurred by user $M_1$ from user $M_2$ if the following is true:

$$P = \left(\frac{m_1}{n_1}\right)^\gamma \left(\frac{m_2}{m_1}\right)^\gamma = \left(\frac{m_2}{n_1}\right)^\gamma \le P_a$$

where P a is a specified threshold value for P, the ratio of interfering to serving signal strengths. The same requirement holds with no power control on the up-link direction in order to prevent up-link interference on user $M_2$ from user $M_1$. Whether or not the method is effective will depend on the interference relationship between the two cells. There are two possibilities. The distance from the neighbor cell could decrease as the user's distance from its serving base station increases; or, alternatively, it could increase. FIG. 16 illustrates the first situation; FIG. 17 illustrates the second. The proposed method is effective for the first case; that is when the dominant cause of interference increases as the user-2-base distance increases.

The effectiveness of the matching procedure described will depend on how spread out the contours $X_k X'_k$ are. This, in turn, depends on the range of power control, which is selected to minimize the probability of adjacent-channel interference.

4.3.1 Decreasing neighbor-cell Distance with Increased User-to-base Distance

In order to reduce down-link interference in cell 1, high $m_2$ values should be matched with high $n_1$ values, according to condition (3) above. Similarly, in order to minimize interference in cell 2, high $m_1$ values should be matched with high $n_2$ values. But, in general, the channel assignments resulting from these two criteria will be different. To obtain a unique channel assignment, users in each cell are ranked by the same criterion. If we use the distance from the serving base station, we match high $m_1$ values with low $m_2$ values, and vice versa. Using distance from the serving base station as the ranking metric achieves the desired result because $n_I$ decreases as $m_1$ increases, by our assumption.

The use of distance as a surrogate metric is appropriate for the examples of sectorized cells considered in FIG. 16. The substitution becomes less easy to justify with the omni-directional cells shown in FIG. 15, where the above-stated relationship between $n_1$ and $m_1$ does not hold consistently, though it holds in the area of cell 1 that is most vulnerable to interference. Ordering users by their distance from their base station gives good results, although not optimal. The non-optimality becomes evident when two users are on the periphery of their respective cells, but away from the boundary between the two cells. While they cannot cause each other interference, these two users will not be assigned interfering channels. Instead, there will be a substantial channel separation between them, at the expense of other user pairs that are more vulnerable to interference. This notwithstanding, the proposed method is simple to implement and performs well. Additionally, it can be generalized to deal with interfering-channel use by more than one neighbor cells.

5. MIXED POWER CONTROL WITH (USER MATCHING AND) DIRECTED ASSIGNMENT—MPCDA

The Mixed Power Control with User Matching Method can be combined with Directed Assignment.

5.1 Logic

The combined algorithm logic is presented for the situation described above: Decreasing neighbor-cell distance with increased user-to-base distance. The method follows the steps below:

1. Apply mixed power control.
2. The available channels are distributed among channel sets so that each set has a label, '+' or '−', and channels with interference conflicts are assigned in sets of opposite labels.
3. Each cell is assigned a label '+' or '−' so that cells with potentially interfering cells having opposite labels, given the constraint that a cell may use channels only from a set(s) assigned the same label as the cell.
4. Users in each cell are assigned in order of decreasing distance from the serving base station. Cells with a '+' label assign their users starting at one end of the available spectrum, while the cells with a '−' label start placing their users at the other end of the available spectrum.

Step 2 is restrictive only if different channels can cause each other interference when used within the same cell, as in the case of spectrum-adjacent channels. Since interference can occur only between cells of opposite label, by Step 3, Step 4 achieves the desired user-matching of users far from their base station in one cell with users near their base station in the other cell. The probability of interference between neighbor cells is thus reduced.

This algorithm resembles Directed Assignment as it encompasses all the steps of Directed Assignment, plus some more. In low-traffic conditions Directed Assignment decreases the probability of an interfering-channel conflict. In congestion conditions, when Directed Assignment has no impact on interference, the use of power control with proper user matching still reduces the probability of interference.

As in the case of Directed Assignment with departing and arriving calls, users can be packed on either end of the available channel set in two ways. One involves channel re-arrangement upon call departure or call initiation; the other doesn't. If the users are mobile, further channel re-arrangement may be necessary in order to maintain a proper ranking of the users, which may change as they move. Alternatively, one may postpone channel re-arrangement until interference is observed, thus reducing the number of re-arrangements needed.

I. APPENDIX: Communication Direction and Power Control Duality

The potential of a user to cause interference can be measured by the ratio P of the interfering to the serving signal strengths, if both signals were co-channel. The threshold value of P, $P_a$, can be set to reflect the characteristics of the situation at hand, such as antenna diversity, coding scheme, or other. For simplicity, we say that when P is less than or equal to $P_a$ a user will not experience interference.

In this Appendix we derive the necessary and sufficient conditions for P to be below $P_a$ for the following power control policies. The two pure power control policies considered are: full power control (that is, power reduction that equalizes the received signal strengths in a cell), and no power control. 'Mixed' power control policies employ both power control policies mentioned above in different regions of the cell, an inner circle and an outer ring. A useful dual relationship is established between different communication directions and complementary power control policies.

We consider two subscriber units $M_1$ and $M_2$, covered by base stations $B_1$ and $B_2$, respectively, as illustrated in FIG. 15. We define the following notation:

$m_I$ distance of subscriber unit $M_i$ from its own base station $n_I$ distance of subscriber unit $M_i$ from the neighbor base station L(l) propagation loss at distance l due to shadow fading
φ(l) power reduction of the signal serving a call a distance l from the base station
γ propagation loss coefficient
R cell radius.

We consider separately the two communications directions and all power control policies mentioned above.

I.1 Down Link—No Power Control

Let us consider the condition for no interference when no power control is used on the down link. For subscriber unit $M_1$ to experience no down-link interference from subscriber unit $M_2$, the following must be true:

$$P = \frac{L(n_1)}{L(m_1)} \leq P_a$$

If L(l), the propagation loss at distance l, is assumed to be inversely proportional to the γ power of l the above condition becomes:

$$P = \left(\frac{m_1}{n_1}\right)^\gamma \leq P_a$$

I.2 Down Link—Full Power Control

Let us consider now the condition for no down-link interference when there is full power control on the down link. It is:

$$P = \frac{L(n_1)\phi(m_2)}{L(m_1)\phi(m_1)} \leq P_a$$

Since φ(l), the power reduction of a subscriber unit a distance l from its base station, is adjusted to equalize received signals, we have $$\frac{\phi(m_2)}{\phi(m_1)} = \left(\frac{m_2}{m_1}\right)^\gamma$$

and equation (6) becomes:

$$P = \left(\frac{m_1}{n_1}\right)^\gamma \left(\frac{m_2}{m_1}\right)^\gamma = \left(\frac{m_2}{n_1}\right)^\gamma \leq P_a$$

I.3 Down Link—No Power Control Inside, Full Power Control Outside

Let us consider a mixed power control policy whereby there is no power control inside a circle of radius $l_M$, and full power control outside this circle. If both subscriber units are within a distance $l_M$ from their respective base stations, then no power control is used for either of them, and condition (I.2) applies. If they are both at a distance greater than lM, full power control is used for both of them and condition (I.4) applies. A third possibility is that $m_1 < l_M$ and $m_2 \geq l_M$. That is, the signal serving $M_1$ is not reduced by power control, while the signal serving $M_2$ is. Then, the condition for no interference on $M_1$ is the following:

$$P = \frac{L(n_1)\phi(m_2)}{L(m_1)\phi(l_m)} = \left(\frac{m_1}{n_1}\right)^\gamma \left(\frac{m_2}{l_M}\right)^\gamma \leq P_a$$

Finally, if $m_1 \geq l_M$ and $m_2 < l_M$, there would be power control for the signal serving $M_1$ and no power control for the signal serving $M_2$. The condition for no interference is the following:

$$P = \frac{L(n_1)\phi(l_M)}{L(m_1)\phi(m_1)} = \left(\frac{m_1}{n_1}\right)^\gamma \left(\frac{l_M}{m_1}\right)^\gamma = \left(\frac{l_M}{n_1}\right)^\gamma \leq P_a$$

I.4 Up Link—No Power Control

Let us consider now the condition for no up-link interference when there is no power control. It is given by the following inequality:

$$P = \frac{L(n_2)}{L(m_1)} = \left(\frac{m_1}{n_2}\right)^\gamma \leq P_a$$

I.5 Up Link—Full Power Control

Finally, the condition for no interference on the up link when full power control is employed is:

$$P = \frac{L(n_2)\phi(m_2)}{L(m_1)\phi(m_1)} = \left(\frac{m_1}{n_2}\right)^\gamma \left(\frac{m_2}{m_1}\right)^\gamma = \left(\frac{m_2}{n_2}\right)^\gamma \leq P_a$$

I.6 Up Link—Full Power Control Inside, No Power Control Outside

Let us finally consider the mixed power control policy whereby there is full power control inside a circle of radius $l_M$, and no power control outside this circle. If both subscriber units are within a distance $l_M$ from their respective base stations, then full power control is used on both of their signals, and condition (I.8) applies. If they are both at a distance greater than $l_M$, no power control is used on either of their signals, and condition (I.7) applies.

If $m_1 < l_M$ and $m_2 \geq l_M$, the signal of $M_1$ is reduced by power control, while the signal of $M_2$ is not. Then, the condition for no interference on $M_1$ is the following:

$$P = \frac{L(n_2)\phi(l_M)}{L(m_1)\phi(m_1)} = \left(\frac{m_1}{n_2}\right)^\gamma \left(\frac{l_M}{m_1}\right)^\gamma = \left(\frac{l_M}{n_2}\right)^\gamma \leq P_a$$

Finally, if $m_1 \geq l_M$ and $m_2 < l_M$, there would be no power control for the signal of $M_1$ and full power control on the signal of $M_2$. The condition for no interference is the following:

$$P = \frac{L(n_2)\phi(m_2)}{L(m_1)\phi(l_M)} = \left(\frac{m_1}{n_2}\right)^\gamma \left(\frac{m_2}{l_M}\right)^\gamma \leq P_a$$

I.7 Duality Relationships

Examining the above conditions we find some cross-equivalencies. For a pair of users, the down-link condition for no interference for one member of the pair is identical to the up-link condition for the other member if complementary power control policies are used on the two communication links. For instance, if we applied no power control on the down and full power control on the up link, the relevant conditions, (I.2) and (I.8), are identical. Similarly, conditions (I.4) and (I.7) are identical. This means that if a user receives no down-link interference from a neighbor-cell user, it inflicts no up-link interference on that neighbor-cell user.

The consequence of above equivalencies is the following. Suppose one wishes to establish that a pair of users can be assigned mutually interfering channels without causing each other interference on either communication direction. If complementary power control policies are used on the two communication directions, it is sufficient to check just two interference conditions, one for each member of the pair, on a single communication direction or, equivalently, both communication directions for one member of the pair.

TABLE 1

$dB(T_c) = 18$

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 17.98 | 17.93 | 17.79 | 17.36 | 16.23 | 14.46 | 6.66 | 0.90 | −7.02 | −19.01 |
| 2 | 18.00 | 18.00 | 18.00 | 18.00 | 17.99 | 17.98 | 17.79 | 17.21 | 14.46 | 4.78 |
| 3 | 18.00 | 18.00 | 18.00 | 18.00 | 18.00 | 18.00 | 17.99 | 17.97 | 17.79 | 15.47 |
| 4 | 18.00 | 18.00 | 18.00 | 18.00 | 18.00 | 18.00 | 18.00 | 18.00 | 17.98 | 17.67 |
| 5 | 18.00 | 18.00 | 18.00 | 18.00 | 18.00 | 18.00 | 18.00 | 18.00 | 18.00 | 17.94 |

TABLE 2

$dB(T) = 18$

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 18.02 | 18.07 | 18.22 | 18.75 | 21.03 | NA | NA | NA | NA | NA |
| 2 | 18.00 | 18.00 | 18.00 | 18.00 | 18.01 | 18.02 | 18.22 | 18.97 | NA | NA |
| 3 | 18.00 | 18.00 | 18.00 | 18.00 | 18.00 | 18.00 | 18.01 | 18.03 | 18.22 | 18.36 |
| 4 | 18.00 | 18.00 | 18.00 | 18.00 | 18.00 | 18.00 | 18.00 | 18.00 | 18.02 | 18.36 |
| 5 | 18.00 | 18.00 | 18.00 | 18.00 | 18.00 | 18.00 | 18.00 | 18.00 | 18.00 | 18.06 |

TABLE 3

| | Offered Load (erlangs per cell) | | | | | |
|---|---|---|---|---|---|---|
| | 40.3 (2% blocking) | | 49.6 (10% blocking) | | 58.5 (20% blocking) | |
| METHOD | ACC Prob | ACI Prob | ACC Prob | ACI Prob | ACC Prob | ACI Prob |
| RANDOM | 0.79 | 0.106 | 0.89 | 0.121 | 0.93 | 0.129 |
| DA | 0.73 | 0.101 | 0.88 | 0.120 | 0.93 | 0.129 |
| EPCDA | 0.73 | 0.005 | 0.88 | 0.019 | 0.93 | 0.028 |

TABLE 4

(a)

| A | B | C | D |
|---|---|---|---|
| 1 | 2 | 1 | 2 |
| 3 | 4 | 3 | 4 |
| 5 | 6 | 5 | 6 |
| 7 | 8 | 7 | 8 |
| 9 | 10 | 9 | 10 |
| 11 | 12 | 11 | 12 |

(b)

| A '−' | B '+' | C '+' | D '−' |
|---|---|---|---|
| 1 | 2 | 1 | 2 |
| 3 | 4 | 3 | 4 |
| 5 | 6 | 5 | 6 |
| 7 | 8 | 7 | 8 |
| 9 | 10 | 9 | 10 |
| 11 | 12 | 11 | 12 |

TABLE 5

| '+' Cell | | '−' Cell |
|---|---|---|
| 1 | I | 1 |
| 2 | N | 2 |
| 3 | N | 3 |
| 4 | E | 4 |
| 5 | R | 5 |
| 6 | — | 6 |
| 7 | G | 7 |
| 8 | R | 8 |
| 9 | P | 9 |
| 19 | O | 19 |
| 18 | U | 18 |
| 17 | T | 17 |
| 16 | E | 16 |
| 15 | R | 15 |
| 14 | — | 14 |
| 13 | G | 13 |
| 12 | R | 12 |
| 11 | P | 11 |
| 10 | | 10 |

TABLE 6

| '+' Cell | | '−' Cell |
|---|---|---|
| 1 | A | 1 |
| 2 | L | 2 |
| 3 | L | 3 |
| 4 | O | 4 |
| 5 | C | 5 |
| 6 | A | 6 |
| 7 | T | 7 |
| 8 | E | 8 |
| 9 | D | 9 |
| 19 | A | 19 |
| 18 | C | 18 |
| 17 | C | 17 |
| 16 | E | 16 |
| 15 | S | 15 |
| 14 | S | 14 |
| 13 | I | 13 |
| 12 | B | 12 |
| 11 | L | 11 |
| 10 | E | 10 |

TABLE 7

| 1 | — | — | 2 |
|---|---|---|---|
| 3 | S | S | 4 |
| 5 | E | E | 6 |
| 7 | T | T | 8. |
| . | — | — | . |
| . | 1 | 2 | . |
| . | | | . |
| C/2 − 1 | | | C/2 |
| C/2 + 1 | — | — | C/2 + 2 |
| C/2 + 3 | S | S | C/2 + 4 |
| C/2 + 5 | E | E | C/2 + 6 |
| . | T | T | . |
| . | — | — | . |
| . | 3 | 4 | . |
| C − 1 | | | C |

REFERENCES

1. M. Benvenitsa, U.S. Pat. No. 5,404,574, "Apparatus and Method for Non-Regular Channel Assignment in Wireless Communications Networks".
2. S. W. Halpern, "Reuse partitioning in cellular systems", Proceedings of the 33rd Vehicular Technology Conference, pp. 322–327, May 1983.

What is claimed is:

1. A method of managing interference in a wireless communications network having areas partitioned into a plurality of cells, wherein a second plurality of communications channels are allocated among said cells, and wherein there exist pairs of cells causing each other interference, said method comprising the steps of:

causing each cell in said plurality of cells to be assigned one of two labels, whereby no pair of interfering cells is assigned the same label;

assigning channels to users in each cell of said plurality of cells wherein said cells' users are assigned to channels starting on one end of an assigned spectrum for first cells with a first said label, while for second cells with a second said label, said second cells' users are assigned channels starting on an opposite end of the assigned spectrum.

2. A method of managing interference in a wireless communications network having areas partitioned into a plurality of cells, wherein a second plurality of communications channels are allocated among said cells, and wherein there exist pairs of cells causing each other interference, said method comprising the steps of:

causing each cell in said plurality of cells to be assigned one of two labels, whereby no pair of interfering cells is assigned the same label;

assigning channels to users for cells with a first said label, wherein said cells' users are assigned to channels starting on one end of an assigned spectrum;

assigning channels to users for cells with a second said label, wherein said cells' users are assigned to channels starting on an opposite end of said assigned spectrum from said one end.

3. A method for managing co-channel interference in a wireless communications network having areas partitioned into a plurality of cells, wherein a second plurality of communications channels are allocated among said cells, and wherein there exist pairs of cells causing each other co-channel interference, said method comprising the steps of:

causing each cell in said plurality of cells to be assigned either a first label or a second label, whereby no pair of interfering cells is assigned the same label;

assigning a group of channels to users in a first cell having said first label and in a second cell having said second label of said plurality of cells, wherein said first cells' users are assigned to channels starting on one end of an assigned spectrum for cells and said second cells' users are assigned channels starting on an opposite end of said assigned spectrum.

4. A method for managing adjacent channel interference in a wireless communications network having areas partitioned into a plurality of cells, wherein a second plurality of communications channels are allocated among said cells, and wherein there exist pairs of cells causing each other adjacent channel interference, said method comprising the steps of:

causing each cell in said plurality of cells to be assigned either a first label or a second label, whereby no pair of interfering cells is assigned the same label;

assigning adjacent channels to users in a first cell having said first label and in a second cell having said second label of said plurality of cells, wherein said first cells' users are assigned to channels starting on one end of an assigned spectrum for cells and said second cells' users are assigned channels starting on an opposite end of said assigned spectrum.

5. A method of managing interference in a wireless communications network having areas partitioned into a plurality of cells, wherein a second plurality of communications channels are allocated among said cells, and wherein there exist pairs of cells causing each other interference, said method comprising the steps of:

determining a radial distance from a base station in a first cell, so that there is an acceptable level of interference from a second cell;

applying power control for down-link transmissions from the base station to a first mobile unit located beyond the radial distance from said base station in the first cell, said first mobile unit subject to interference from said second cell; and omitting an application of power control for down-link transmissions from the base station to a second mobile unit located within the radial distance from said base station, said second mobile unit subject to interference from said second cell.

6. The method of managing interference of claim 5, which further comprises:

applying power control for up-link transmissions from a mobile unit to said base station for mobile units located within said radial distance from said base station; and omitting an application of power control for up-link transmissions from a mobile unit to said base station for mobile units located beyond said radial distance from said base station.

7. A method for managing co-channel interference in a wireless communications network having areas partitioned into a plurality of cells, wherein a second plurality of communications channels are allocated among said cells, and wherein there exist pairs of cells causing each other co-channel interference, said method comprising the steps of:

determining a radial distance from a base station in a first cell, so that there is an acceptable level of co-channel interference from a second cell;

applying power control for down-link transmissions from the base station to a first mobile unit located beyond the radial distance from said base station in the first cell, said first mobile unit subject to co-channel interference from said second cell; and omitting an application of power control for down-link transmissions from the base station to a second mobile unit located within the radial distance from said base station, said second mobile unit subject to co-channel interference from said second cell.

8. The method of managing interference of claim 7, which further comprises:

applying power control for up-link transmissions from a mobile unit to said base station for mobile units located within said radial distance from said base station; and omitting an application of power control for up-link transmissions from a mobile unit to said base station for mobile units located beyond said radial distance from said base station.

9. A method for managing adjacent channel interference in a wireless communications network having areas partitioned into a plurality of cells, wherein a second plurality of communications channels are allocated among said cells, and wherein there exist pairs of cells causing each other adjacent channel interference, said method comprising the steps of:

determining a radial distance from a base station in a first cell, so that there is an acceptable level of adjacent channel interference from a second cell;

applying power control for down-link transmissions from the base station to a first mobile unit located beyond the radial distance from said base station in the first cell, said first mobile unit subject to adjacent channel interference from said second cell; and omitting an application of power control for down-link transmissions from the base station to a second mobile unit located within the radial distance from said base station, said second mobile unit subject to adjacent channel interference from said second cell.

10. The method of managing interference of claim 9, which further comprises:

applying power control for up-link transmissions from a mobile unit to said base station for mobile units located within said radial distance from said base station; and omitting an application of power control for up-link transmissions from a mobile unit to said base station for mobile units located beyond said radial distance from said base station.

11. A method of managing interference in a wireless communications network having areas partitioned into a plurality of cells, wherein a second plurality of communications channels are allocated among said cells, and wherein there exist pairs of cells causing each other interference that increases with increased distance of the users within these cells from their serving base station, said method comprising the steps of:

determining a radial distance from a first base station in a first cell, so that there is an acceptable level of interference from a second cell;

applying power control for down-link transmissions from said first base station to a first user located beyond the radial distance from said first base station in the first cell, said first user subject to interference from said second cell;

omitting an application of power control for down-link transmissions from the base station to a second user located within the radial distance from said first base station, said second user subject to interference from said second cell;

assigning a first channel in said first cell to a user most distant from said first base station and assigning a second channel in said second cell that is subject to interference from said first channel, to a user who is closest to a second base station in said second cell; and assigning a third channel in said first cell to a user closest to said first base station and assigning a fourth channel in said second cell that is subject to interference from said third channel, to a user who is distant from said second base station.

12. A method of managing co-channel interference in a wireless communications network having areas partitioned into a plurality of cells, wherein a second plurality of communications channels are allocated among said cells, and wherein there exist pairs of cells causing each other co-channel interference that increases with increased distance of the users within these cells from their serving base station, said method comprising the steps of:

determining a radial distance from a first base station in a first cell, so that there is an acceptable level of co-channel interference from a second cell;

applying power control for down-link transmissions from said first base station to a first user located beyond the radial distance from said first base station in the first cell, said first user subject to co-channel interference from said second cell;

omitting an application of power control for down-link transmissions from the base station to a second user located within the radial distance from said first base station, said second user subject to co-channel interference from said second cell;

assigning a first channel in said first cell to a user who is distant from said first base station and assigning a second channel in said second cell that is subject to co-channel interference from said first channel, to a user who is close to a second base station in said second cell; and assigning a third channel in said first cell to a user who is close to said first base station and assigning a fourth channel in said second cell that is subject to co-channel interference from said third channel, to a user who is distant from said second base station.

13. A method of managing adjacent channel interference in a wireless communications network having areas partitioned into a plurality of cells, wherein a second plurality of communications channels are allocated among said cells, and wherein there exist pairs of cells causing each other adjacent channel interference that increases with increased distance of the users within these cells from their serving base station, said method comprising the steps of:

determining a radial distance from a first base station in a first cell, so that there is an acceptable level of adjacent channel interference from a second cell;

applying power control for down-link transmissions from said first base station to a first user located beyond the radial distance from said first base station in the first cell, said first user subject to adjacent channel interference from said second cell;

omitting an application of power control for down-link transmissions from the base station to a second user located within the radial distance from said first base station, said second user subject to adjacent channel interference from said second cell;

assigning a first channel in said first cell to a user who is distant from said first base station and assigning a second channel in said second cell that is subject to adjacent channel interference from said first channel, to a user who is close to a second base station in said second cell; and assigning a third channel in said first cell to a user who is close to said first base station and assigning a fourth channel in said second cell that is subject to adjacent channel interference from said third channel, to a user who is distant from said second base station.

14. A method of managing interference in a wireless communications network having areas partitioned into a plurality of cells, wherein a second plurality of communications channels are allocated among said cells and wherein there exist pairs of cells causing each other interference that increases with increased distance of the users within these cells from their serving base station, said method comprising the steps of:

applying power control;

causing each cell in said plurality of cells to be assigned one of two labels, whereby no pair of interfering cells is assigned the same label;

assigning channels to users in each cell of said plurality of cells wherein high power users are assigned to channels starting on one end of the assigned spectrum for cells with the first said label, while for cells with the second label, the same users are assigned channels starting on the opposite end of the assigned spectrum.

15. The method of managing interference of claim 14 wherein said assigning step operates to assign channels to users in each cell based on the distance from each said user's serving base station, subject to a constraint that, for cells with the first label, said cells' users are assigned to channels starting on one end of the assigned spectrum in order of decreasing distance from each said user's serving based station, while for cells with the second label, the said users are assigned channels starting on the opposite end of the assigned spectrum in order of decreasing distance from each said user's serving base station.

16. The method of managing interference of claim 15 wherein channel assignments within a cell are rearranged in accordance with the methodology of said claim upon departure of a user from said cell.

17. The method of managing interference of claim 14 wherein said assigning step operates to assign channels to users in each cell based on the distance from each said user's serving base station, subject to a constraint that, for cells with the first label, said cells' users are assigned to channels starting on one end of the assigned spectrum in order of decreasing distance from each said user's serving based station, while for cells with the second label, the said users are assigned channels starting on the opposite end of the assigned spectrum in order of increasing distance from each said user's serving base station.

18. The method of managing interference of claim 17 wherein channel assignments within a cell are rearranged in accordance with the methodology of said claim upon departure of a user from said cell.

19. The method of managing interference of claim 14 wherein power control is applied for "down-link" transmissions from a base station to a user only as to users located beyond a radial distance from said base station, said radial distance being determined so as to achieve an acceptable level of interference.

20. The method of managing interference of claim 14, wherein power control is applied for "down-link" transmissions only as to users located beyond a radial distance from said central transmissions site, said radial distance being determined so as to achieve an acceptable level of interference.

21. The method of managing interference of claim 14 wherein power control is applied for "up-link" transmission from a user to a base station only as to users located within a radial distance from said base station, said radial distance being determined so as to achieve an acceptable level of interference.

22. The method of managing interference of claim 14 wherein power control is applied for "up-link" transmissions only as to users located within a radial distance from said base station, said radial distance being determined so as to achieve an acceptable level of interference.

23. A method of managing interference in a wireless communications network having service areas partitioned into a plurality of cells, wherein a second plurality of communications channels are available for allocation among said cells, said method comprising the step of:

applying power control for transmissions to and from mobile units served by a central transmission site subject to the following constraints:

for transmissions from a central transmission site to a mobile unit ("down-link") said power control is applied only as to mobile units located beyond a radial distance from said central transmission site; and for transmissions from a mobile unit to a central transmission site ("up-link") said power control is applied only as to mobile units located within a radial distance from said central transmission site;

wherein each said radial distance is determined so as to achieve an acceptable level of interference.

* * * * *